United States Patent
Guim Bernat et al.

(10) Patent No.: US 10,691,345 B2
(45) Date of Patent: Jun. 23, 2020

(54) SYSTEMS, METHODS AND APPARATUS FOR MEMORY ACCESS AND SCHEDULING

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Mark Schmisseur, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 84 days.

(21) Appl. No.: 15/719,729

(22) Filed: Sep. 29, 2017

(65) Prior Publication Data

US 2019/0102090 A1 Apr. 4, 2019

(51) Int. Cl.
| | |
|---|---|
| *G06F 12/00* | (2006.01) |
| *G06F 3/06* | (2006.01) |
| *G06F 9/48* | (2006.01) |
| *G06F 13/16* | (2006.01) |

(52) U.S. Cl.
CPC .......... *G06F 3/0611* (2013.01); *G06F 3/0659* (2013.01); *G06F 3/0673* (2013.01); *G06F 9/4881* (2013.01); *G06F 13/1684* (2013.01); *G06F 13/1689* (2013.01)

(58) Field of Classification Search
None
See application file for complete search history.

(56) References Cited

U.S. PATENT DOCUMENTS

| | | | |
|---|---|---|---|
| 2006/0112250 A1* | 5/2006 | Walker | G06F 13/1689 711/167 |
| 2008/0209113 A1* | 8/2008 | Atzmon | G11C 11/56 711/103 |
| 2009/0307691 A1 | 12/2009 | Moscibroda et al. | |
| 2010/0091537 A1* | 4/2010 | Best | G11C 5/02 365/51 |

(Continued)

OTHER PUBLICATIONS

The extended European search report received for the Application No. EP18191576.0 dated Mar. 27, 2019, 7 Pages. (Reference purpose only).

*Primary Examiner* — Ryan Bertram
*Assistant Examiner* — Trang K Ta
(74) *Attorney, Agent, or Firm* — Viering, Jentschura & Partner MBB

(57) ABSTRACT

A memory controller method and apparatus, which includes a modification of at least one of a first timing scheme or a second timing scheme based on information about one or more data requests to be included in at least one of a first queue scheduler or a second queue scheduler, the first timing scheme indicating when one or more requests in the first queue scheduler are to be issued to the first memory set via a first memory set interface and over a channel, the second timing scheme indicating when one or more requests in the second queue scheduler are to be issued to the second memory set via a second memory set interface and over the channel. Furthermore, an issuance of a request to at least one of the first memory set in accordance with the modified first timing scheme or the second memory set in accordance with the modified second timing scheme may be included.

20 Claims, 10 Drawing Sheets

(56) References Cited

U.S. PATENT DOCUMENTS

| | | | |
|---|---|---|---|
| 2011/0107037 A1* | 5/2011 | Yoshida | G06F 11/3037 |
| | | | 711/154 |
| 2011/0276972 A1 | 11/2011 | Chung et al. | |
| 2011/0276973 A1 | 11/2011 | Chung et al. | |
| 2012/0278530 A1 | 11/2012 | Ebsen | |
| 2013/0054901 A1 | 2/2013 | Biswas et al. | |
| 2014/0101380 A1* | 4/2014 | Svendsen | G06F 11/3037 |
| | | | 711/105 |
| 2014/0229666 A1* | 8/2014 | Schoenborn | G11C 29/06 |
| | | | 711/105 |
| 2016/0124873 A1* | 5/2016 | Xu | G06F 13/4243 |
| | | | 711/105 |
| 2017/0060416 A1* | 3/2017 | Cho | G06F 3/068 |
| 2017/0083474 A1* | 3/2017 | Meswani | G06F 13/4234 |

\* cited by examiner

700

Modifying at least one of a first timing scheme or a second timing scheme based on information about one or more data requests to be included in at least one of a first queue scheduler or a second queue scheduler, the first timing scheme indicating when one or more requests in the first queue scheduler are to be issued to the first memory set via a first memory set interface and over a common channel, the second timing scheme indicating when one or more requests in the second queue scheduler are to be issued to the second memory set via a second memory set interface and over the common channel

705

Issuing at least one of a request to the first memory set in accordance with the modified first timing scheme or a request to the second memory set in accordance with the modified second timing scheme

Modifying at least one of a first timing scheme or a second timing scheme based on information about one or more data requests included in at least one of a first queue scheduler or a second queue scheduler, the first timing scheme indicating when one or more requests in the first queue scheduler are to be issued to the first memory set via a first memory set interface and over a common channel, the second timing scheme indicating when one or more requests in the second queue scheduler are to be issued to the second memory set via a second memory set interface and over the common channel

905

Issuing at least one of a request to the first memory set in accordance with the modified first timing scheme or a request to the second memory set in accordance with the modified second timing scheme

SYSTEMS, METHODS AND APPARATUS FOR MEMORY ACCESS AND SCHEDULING

TECHNICAL FIELD

Various aspects described herein generally relate to systems, methods and apparatus for optimizing the management of memory resources, and more particularly relate to enhanced memory access, scheduling architectures and methods associated therewith.

BACKGROUND

Advances in memory technology may integrated within client and server platforms for optimized performance. Although the improved capabilities from such innovations may be apparent from experimental data, the methodology to realize new technologies into a manufactured product may present real-world challenges. In certain implementations, new dedicated interfaces on a central processing unit (CPU) and/or dedicated sockets on a motherboard may be added in order to integrate these new technologies. Consequently, the benefit of providing the option to incorporate such advances may be offset by the additional costs associated therewith and the probability of use.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 7 shows a first exemplary method for performing a data operation in accordance with some aspects;

FIG. 9 shows a third exemplary method for performing a data operation in accordance with some aspects.

DESCRIPTION

Figure 1:
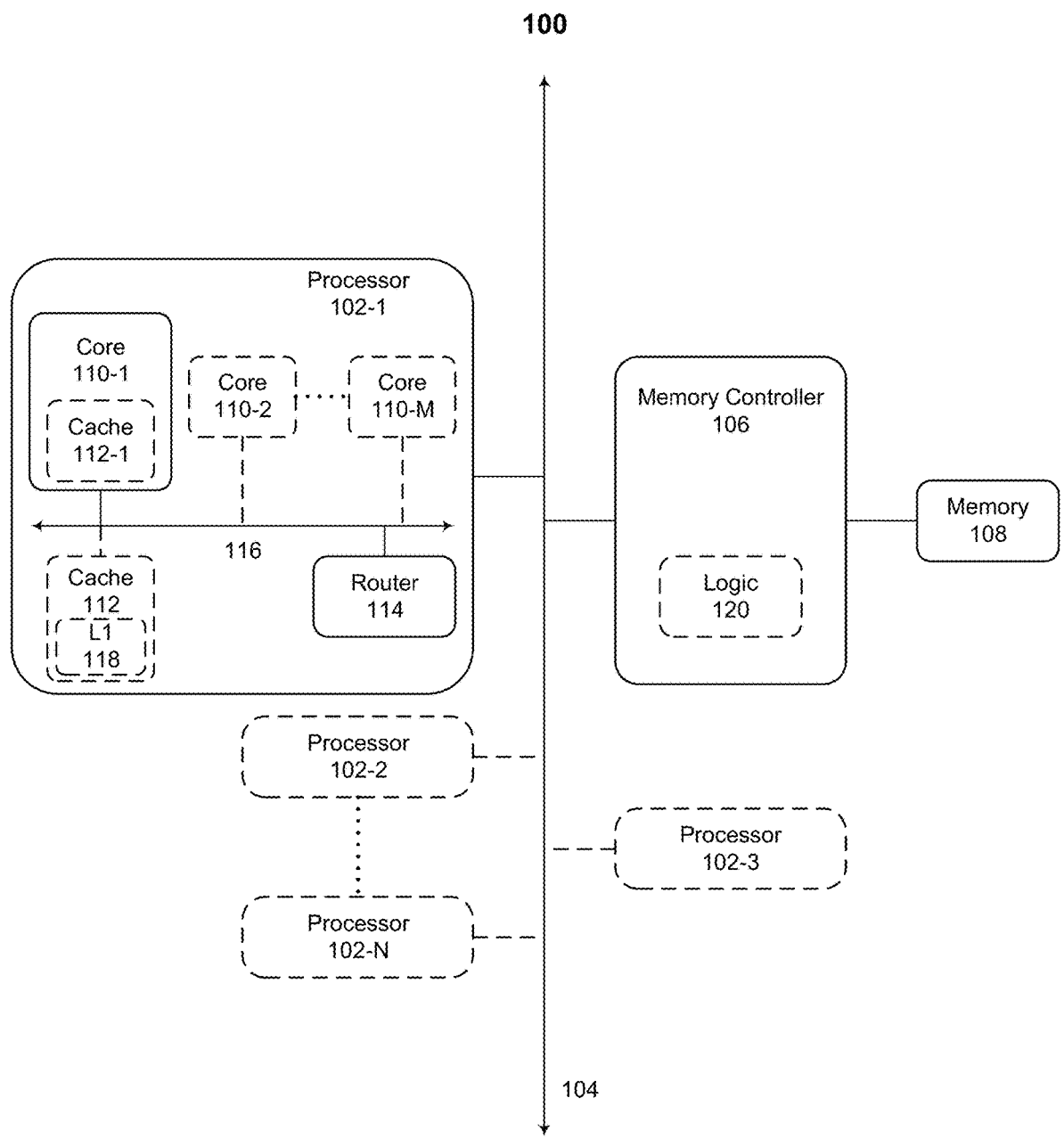
FIG. 1 shows a first configuration of an exemplary computing system architecture.

The following detailed description refers to the accompanying drawings that show, by way of illustration, specific details and aspects in which the disclosure may be practiced. Throughout the drawings, it should be noted that like reference numbers are used to depict the same or similar elements, features, and structures.

The word "exemplary" is used herein to mean "serving as an example, instance, or illustration." Any aspect or design described herein as "exemplary" is not necessarily to be construed as preferred or advantageous over some aspects or designs.

The words "plural" and "multiple" in the description and the claims expressly refer to a quantity greater than one. Accordingly, any phrases explicitly invoking the aforementioned words (e.g. "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more. The terms "proper subset," "reduced subset," and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g., a scalar), a 1×M vector (e.g., a row vector), and an M×1 vector (e.g., a column vector). Similarly, it is appreciated that references to a "matrix" may refer to matrix of any size or orientation, e.g. including a 1×1 matrix (e.g., a scalar), a 1×M matrix (e.g., a row vector), and an M×1 matrix (e.g., a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit." It is understood that any two (or more) of the circuits detailed herein may be realized as a single circuit with equivalent functionality or the like, and conversely that any single circuit detailed herein may be realized as two (or more) separate circuits with equivalent functionality or the like. Additionally, references to a "circuit" may refer to two or more circuits that collectively form a single circuit.

As used herein, "memory," "memory device," and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, etc., or any combination thereof. Furthermore, it is appreciated that registers, shift registers, processor registers, data buffers, etc., are also embraced herein by the term memory.

It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

A volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In some aspects, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Various aspects may be applied to any memory device that comprises non-volatile memory. In one aspect, the memory device is a block addressable memory device, such as those based on negative-AND (NAND) logic or negative-OR (NOR) logic technologies. A memory may also include future generation nonvolatile devices, such as a 3D XPoint memory device, or other byte addressable write-in-place nonvolatile memory devices. A 3D XPoint memory may comprise a transistor-less stackable crosspoint architecture in which memory cells sit at the intersection of word lines and bit lines and are individually addressable and in which bit storage is based on a change in bulk resistance.

In some aspects, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thiristor based memory device, or a combination of any of the above, or other memory. The terms memory or memory device may refer to the die itself and/or to a packaged memory product.

FIG. 1 shows a first configuration of an exemplary computing system 100 architecture. As shown in FIG. 1, the system 100 may include one or more processors 102-1-102-N, interconnection 104, memory controller 106, and/or memory 108. Although one or more processors 102-1-102-N, interconnection 104, memory controller 106, and memory 108 are illustrated within the computing system 100 of FIG. 1, some aspects may employ additional and/or different processors, interconnections, memory controllers, memory, and/or other elements.

With continued reference to FIG. 1, the one or more processors 102-1-102-N may be generally referred to herein as "processors 102" and more generally "processor 102." Each processor 102 of the one or more processors 102-1-102-N may include various components and/or aspects. While some of these components and/or aspects are described with reference to processor 102-1, each of the remaining processors 102-2-102-N may include the same or similar components and/or aspects discussed with reference to the processor 102-1.

As shown in FIG. 1, processor 102-1 may, in some aspects, include one or more processor cores 110-1-110-M, a cache 112, a router 114, and/or an interconnection 116. Although one or more processor cores 110-1-110-M, cache 112, router 114 and interconnection 116 are illustrated within processor 102-1 of FIG. 1, some aspects may employ additional and/or different processor cores, caches, routers, interconnections and/or other elements.

In some aspects, the one or more processors 102-1-102-N may configured to communicate via an interconnection 104 (e.g., bus). According to at least one aspect, various components of the processor 102-1 may communicate with the cache 112 directly, through a bus (e.g., interconnection 116), and/or a memory controller (e.g., memory controller 106).

With continued reference to FIG. 1, the one or more processor cores 110-1-110-M may be generally referred to herein as "cores 110" and more generally "core 110." Each core 110 of the one or more processor cores 110-1-110-M may include various components and/or aspects. While some of these components and/or aspects are described with reference to processor core 110-1, each of the remaining processors 110-2-110-M may include the same or similar components and/or aspects discussed with reference to the processor core 110-1.

With continued reference to FIG. 1, the cache 112 may, in some aspects, be a shared cache or a private cache. According to at least one aspect, the cache 112 may be configured to store data (e.g., including instructions) that are utilized by one or more components of the processor 102-1, such as the core 110-1. The cache 112 may, in some aspects, be configured to locally cache data stored in the memory 108 for faster access by one or more components of the processors 102-1-102-N. In at least one aspect, the cache 112 may have various levels. For example, the cache 112 may include one or more level 1 (L1) caches 118-1-118-M, one or more mid-level caches and/or one or more last-level caches (LLCs).

With continued reference to FIG. 1, the router 114 may, for instance, be used to communicate between various components of the processor 102-1 and/or system 100. In some aspects, the processor 102-1 may include more than one router 114. According to at least one aspect, a plurality of routers 114 may thus be in communication to enable data routing between various components inside and/or outside of the processor 102-1.

In some aspects, cache 112 or any portion thereof may be included within the one or more processing cores 110-1-110-M. According to at least one aspect, processing core 110-1 may include a cache 112-1. Although the cache 112-1 is illustrated within the processing core 110-1 of FIG. 1, some aspects may employ additional and/or different caches, and/or other elements.

The one or more L1 caches 118-1-118-M may, in some aspects, be generally referred to herein as "L1 cache 118." Each L1 cache 118 of the one or more one or more L1 caches 118-1-118-M may include various components and/or aspects. While some of these components and/or aspects are described with reference to the L1 cache 118-1, each of the remaining L1 caches 118-2-118-M may include the same or similar components and/or aspects discussed with reference to the L1 cache 118-1.

In some aspects, the cores 110 may be implemented on a single integrated circuit (IC) chip. According to at least one aspect, the IC chip may include one or more caches, one or more buses or interconnections, one or more memory controllers, and/or other components. The one or more caches may, in some aspects, include shared and/or private caches (e.g., cache 108). In at least one aspect, the one or more buses or interconnections may include interconnection 116. According to some aspects, the one or more memory controllers may include any memory controller (e.g., memory controller 106) described with respect to FIGS. 1-10.

As shown in FIG. 1, memory controller 106 may, for instance, be configured to implement logic 120. In some aspects, logic 120 may include a portion of the software stack of the computing system 100. According to at least one aspect, logic 120 may be parsed into different subsets, such as 120-1-120-K. One or more of the subsets 120-1-120-K of logic 120 may, in some aspects, be stored in a location in the computing system 100, individually, collectively, and/or some combination thereof. In at least one aspect, logic 120 may be included in one or more processors 102-1-102-N, included in a chipset, included in the memory controller 106, included in a store code of a persistent storage device, and/or coupled to one or more processors 102-1-102-N, directly or via one or more interconnects or busses, such as those described with reference to FIGS. 1-10. Although logic 120 is illustrated within memory controller 106 of FIG. 1, some aspects may employ additional and/or different logic and/or other elements.

With continued reference to FIG. 1, logic 120 of the memory controller 106 may include a set of processor executable instructions, which when executed by one or more processors 102-1-102-N causes the one or more processors 102-1-102-N to perform one or more operations. In some aspects, the one or more operations may include issuing one or more read requests to memory 108. According to at least one aspect, the one or more operations may include issuing one or more write requests to memory 108.

In some aspects, the memory 108 may comprise a pool of memory of the same or different memory technologies. According to at least one aspect, memory 108 may be coupled to memory controller 106 through one or more interfaces. As shown in FIG. 1, memory 108 may, in some aspects, be coupled to other components of system 100 through a memory controller 106. In at least one aspect, memory 108 may, in some aspects, be coupled to the one or more processors 102-1-102-N via the interconnection 104. Although the memory controller 106 is shown to be coupled between the interconnection 104 and the memory 108, the memory controller 106 may be located elsewhere in system 100. For instance, memory controller 106 may be provided within one of the processors 102, such as in FIG. 2.

Figure 2:
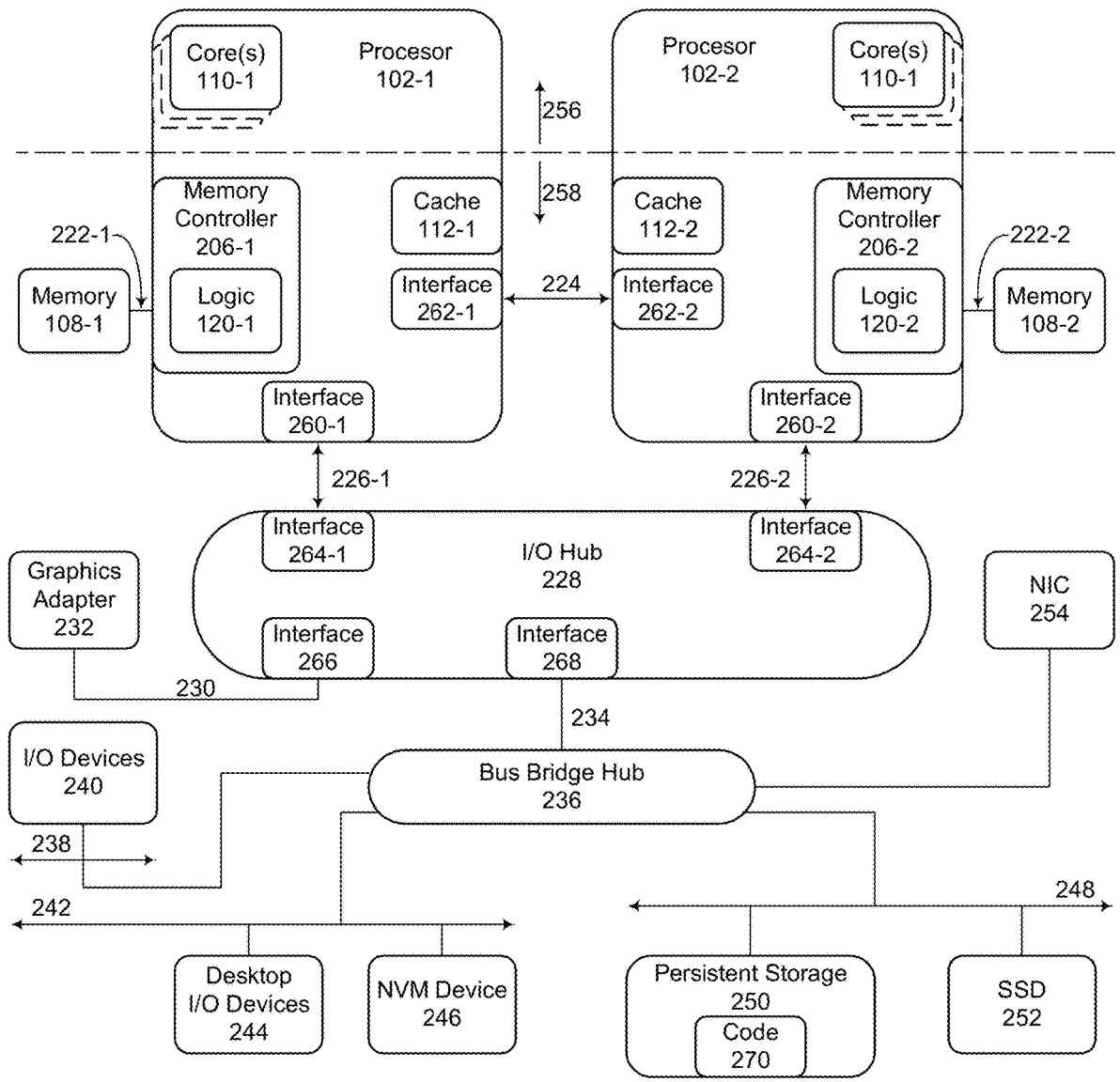
FIG. 2 shows a second configuration of an exemplary computing system architecture.

FIG. 2 shows a second configuration of an exemplary computing system 200 architecture. As shown in FIG. 2, the system 200 may include a first processor 102-1, a second processor 102-N, a first memory interconnection 222-1, a second memory interconnection 222-2, a first memory 108-1, a second memory 108-2, a processor-processor interconnection 224, a first processor-hub interconnection 226-1, a second processor-hub interconnection 226-2, an Input/Output (I/O) hub 228, a graphics interconnection 230, a graphics adapter 232, a hub-hub interconnection 234, a bus bridge hub 236, a general purpose serial communication bus 238, I/O devices 240, a low bandwidth bus 242, desktop I/O devices 244, an NVM device 246, a storage protocol bus 248, a persistent storage device 250, a solid state drive (SSD) 252, and/or a network interface controller (NIC) 254. Although the first processor 102-1, the second processor 102-N, the first memory interconnection 222-1, the second memory interconnection 222-2, the first memory 108-1, the second memory 108-2, the processor-processor interconnection 224, the first processor-hub interconnection 226-1, the second processor-hub interconnection 226-2, the I/O hub 228, the graphics interconnection 230, the graphics adapter 232, the hub-hub interconnection 234, the bus bridge hub 236, the general purpose serial communication bus 238, the I/O devices 240, the low bandwidth bus 242, the desktop I/O devices 244, the NVM device 246, the storage protocol bus 248, the persistent storage device 250, the SSD 252, and/or the NIC 254 are illustrated within the computing system 200 of FIG. 2, some aspects may employ additional or fewer processors, memory interconnections, memories, processor-processor interconnections, processor-hub interconnections, I/O hubs, graphics interconnections, graphics adapters, hub-hub interconnections, bus bridge hubs, general purpose serial communication buses, I/O devices, low bandwidth buses, desktop I/O devices, NVM devices, storage protocol buses, persistent storage devices, SSDs, NICs 130, and/or other elements.

With continued reference to FIG. 2, the first processor 102-1 and the second processor 102-2 may be generally referred to herein as "one or more processors 102-1-102-N," "processors 102" and more generally "processor 102." Although two processors 102 are shown in FIG. 2, this number is merely selected for illustrative purposes. As previously indicated, additional or fewer processors may be implemented depending upon system resources and requirements. Each processor 102 of the one or more processors 102-1-102-N may include various components and/or aspects. While some of these components and/or aspects are described with reference to the first processor 102-1, each of the remaining processors 102-2-102-N may include the same or similar components and/or aspects discussed with reference to the first processor 102-1.

As shown in FIG. 2, each processor 102 of the one or more processors 102-1-102-N include a core region 256 and an integration region 258. For instance, the core region 256 of the first processor 102-1 may include one or more processing cores 110-1-110-M, whereas the integration region 258 of the first processor 102-1 may include a first memory controller 206-1, a first processor-hub interface 260-1, a first processor-processor interface 262-1 and/or a first cache 112-1. Although the core region 256, the integration region 258, the one or more processing cores 110-1-110-M, the first memory controller 206-1, the first processor-hub interface 260-1, the first processor-processor interface 262-1 and the first cache 112-1 are illustrated within the first processor 102-1 of FIG. 2, some aspects may employ additional or fewer regions, processing cores, memory controllers, processor-hub interfaces, processor-processor interfaces, caches and/or other elements. For instance, one or more components and/or aspects described with respect to the one or more processors 102-1-102-N of FIG. 1 may be incorporated into each processor 102 of the one or more processors 102-1-102-N of FIG. 2 either individually, collectively, or a combination thereof.

With continued reference to FIG. 2, the first cache 112-1 and the second cache 112-2 may be generally referred to herein as "one or more caches 112-1-112-N," "caches 112" and more generally "cache 112." Although two caches 112 are shown in FIG. 2, this number is merely selected for illustrative purposes. As previously indicated, additional or fewer caches may be implemented depending upon system resources and requirements. Each cache 112 of the one or more caches 112-1-112-N may include various components and/or aspects. While some of these components and/or aspects are described with reference to the first cache 112-1, each of the remaining caches 112-2-112-N may include the same or similar components and/or aspects discussed with reference to the first cache memory 112-1.

In some aspects, the one or more processing cores 110-1-110-M may each include hardware and firmware resources to support an execution pipeline. According to at least one aspect, one or more components (e.g., L1 cache 118) and/or aspects described with respect to the one or more processing cores 110-1-110-M of FIG. 1 may be incorporated into each processing core 110 of the one or more processing cores 110-1-110-M of FIG. 2 either individually, collectively, or a combination thereof. These resources may, in some aspects, include at least a portion of and/or have access to a cache memory hierarchy. For instance, processing core 110-1 may, in some aspects include L1 cache 118-1 and have access to one or more caches 112-1-112-N. In at least one aspect, the cache memory hierarchy may be shared or private, and may further include a dedicated level one (L1) instruction cache, a dedicated L1 data cache, a level two (L2) data/instruction cache, or a combination thereof. According to some aspects, these resources may further include pre-fetch logic and buffers, branch prediction logic, decode logic, a register file, various parallel execution resources including arithmetic logic units, floating point units, load/store units, address generation units, a data cache, I/O control logic, look-up tables, and/or indices, etc. Although specific implementations of one or more processing cores 110-1-110-M have been described, the present disclosure is not necessarily limited to these aspects.

With continued reference to FIG. 2, the first memory controller 206-1 and a second memory controller 206-2 may be generally referred to herein as "one or more memory controllers 206-1-206-N," "memory controllers 206" and more generally "memory controller 206." Although two memory controllers 206 are shown in FIG. 2, this number is merely selected for illustrative purposes. As previously indicated, additional or fewer memory controllers may be implemented depending upon system resources and requirements. Each memory controller 206 of the one or more memory controllers 206-1-206-N may include various components and/or aspects. While some of these components and/or aspects are described with reference to memory controller 206-1, each of the remaining memory controllers 206-2-206-N may include the same or similar components and/or aspects discussed with reference to the first memory controller 206-1.

In some aspects, each memory controller 206 of the one or more memory controllers 206-1-206-N may, in some aspects, be configured to implement logic 120. Where previously described, one or more aforementioned aspects of logic 120 from FIG. 1 may be incorporated with respect to FIG. 2, either individually, collectively, or a combination thereof. Although the logic 120 is graphically illustrated within each memory controller 206 of FIG. 2, some aspects may employ additional or fewer logic and/or other elements.

With continued reference to FIG. 2, the first memory interconnection 222-1 and the second memory interconnection 222-2 may be generally referred to herein as "one or more memory interconnections 222-1-222-N," "memory interconnections 222" and more generally "memory interconnection 222." Although two memory interconnections 222 are shown in FIG. 2, this number is merely selected for illustrative purposes. As previously indicated, additional or fewer memory interconnections may be implemented depending upon system resources and requirements. Each memory interconnection 222 of the one or more memory interconnections 222-1-222-N may include various components and/or aspects. While some of these components and/or aspects are described with reference to the first memory interconnection 222-1, each of the remaining memory interconnections 222-2-222-N may include the same or similar components and/or aspects discussed with reference to the first memory interconnection 222-1.

With continued reference to FIG. 2, the first memory 108-1 and the second memory 108-2 may be generally referred to herein as "one or more memories 108-1-108-N," "memories 108" and more generally "memory 108." Although two memories 108 are shown in FIG. 2, this number is merely selected for illustrative purposes. As previously indicated, additional or fewer memories may be implemented depending upon system resources and requirements. Each memory 108 of the one or more memories 108-1-108-N may include various components and/or aspects. For instance, each memory 108 of the one or more memories 108-1-108-N may include a set of memory. While some of these components and/or aspects are described with reference to the first memory 108-1, each of the remaining memories 108-2-108-N may include the same or similar components and/or aspects discussed with reference to the first memory 108-1.

In some aspects, each memory controller 206 of the one or more memory controllers 206-1-206-N may be configured to support a bidirectional transfer of data between one or more processors 102-1-102-N and the memory 108 via a memory interconnection 222. For instance, the first memory controller 206-1 may be configured to support a bidirectional transfer of data between one or more processors 102-1-102-N and the first memory 108-1 via the first memory interconnection 222-1. According to least one aspect, each memory controller 206 of the one or more memory controllers 206-1-206-N may be configured to support bidirectional transfer of data between the one or more processors 102-1-102-N and/or the one or more cache memories 112-1-112-N. By way of example, each processor 102 of the one or more processors 102-1-102-N may, in some aspects, be configured to control the first memory controller 206-1 to communicate with the memory 108-1 and/or a the cache 112-1.

With continued reference to FIG. 2, each memory controller 206 of the one or more memory controllers 206-1-206-N may, in some aspects, be configured to receive an I/O request to access a block of the memory 108 and/or the cache 112. According to at least one aspect, each memory controller 206 of the one or more memory controllers 206-1-206-N may be configured to issue one or more requests (e.g., read requests, write requests) to the memory 108 and/or the cache 112 based on the received I/O request. In at least one aspect, one or more of these processes may include cooperation with one or more components (e.g., drivers) identified in the received I/O request.

With continued reference to FIG. 2, the memory 108-1 may, for instance, be considered to be local to the first processor 102-1 and represent a portion of the memory 108 as a whole. In some aspects, the cache 108-1 may be considered to be local to the first processor 102-1 and represent a portion of the cache 108 as a whole. In some aspects, system 200 may be a distributed memory multiprocessor system in which each processor 102 of one or more processors 102-1-102-N can access each portion of the memory 108 and/or the cache 112, whether local or not. According to at least one aspect, while local accesses may have lower latency, accesses to non-local portions of memory 108 and/or cache 112 are permitted.

In some aspects, the memory 108 may be a DDR-type DRAM, whereas one or more memory interconnections 222-1-222-N and one or more memory controllers 206-1-206-N may comply with one or more DDR interface specification. In at least one aspect, memory 108 may include two levels of memory (2LM), or 3D XPoint memory, or DRAM & 3D XPoint memory, etc. Memory 108, in some aspects, may represent a bank of memory interfaces (or slots) that may be populated with corresponding memory circuits for a DRAM capacity and/or 3D XPoint memory capacity. According to some aspects, the bank of memory interfaces may comply with a DDR interface specification, such as DDR and/or DDR-Transactional (DDR-T).

With continued reference to FIG. 2, the first processor-hub interface 260-1 and the second processor-hub interface 260-2 may be generally referred to herein as "one or more processor-hub interfaces 260-1-260-N," "processor-hub interfaces 260" and more generally "processor-hub interfaces 260." Although two processor-hub interfaces 260 are shown in FIG. 2, this number is merely selected for illustrative purposes. As previously indicated, additional or fewer processor-hub interfaces may be implemented depending upon system resources and requirements. Each processor-hub interface 260 of the one or more processor-hub interfaces 260-1-260-N may include various components and/or aspects. While some of these components and/or aspects are described with reference to the first processor-hub interface 260-1, each of the remaining processor-hub interfaces 260-2-260-N may include the same or similar components and/or aspects discussed with reference to the first processor-hub interface 260-1.

With continued reference to FIG. 2, the first processor-processor interface 262-1 and the second processor-processor interface 262-2 may be generally referred to herein as "one or more processor-processor interfaces 262-1-262-N," "processor-processor interfaces 262" and more generally "processor-processor interfaces 262." Although two processor-processor interfaces 262 are shown in FIG. 2, this number is merely selected for illustrative purposes. As previously indicated, additional or fewer processor-processor interfaces may be implemented depending upon system resources and requirements. Each processor-processor interface 262 of the one or more processor-processor interfaces 262-1-262-N may include various components and/or aspects. While some of these components and/or aspects are described with reference to the first processor-processor interface 262-1, each of the remaining processor-processor interfaces 262-2-262-N may include the same or similar components and/or aspects discussed with reference to the first processor-processor interface 262-1.

With continued reference to FIG. 2, the first processor-hub interconnection 226-1 and the second processor-hub interconnection 262-2 may be generally referred to herein as "one or more processor-hub interconnections 226-1-226-N," "processor-hub interconnections 226" and more generally "processor-hub interconnections 226." Although two processor-hub interconnections 226 are shown in FIG. 2, this number is merely selected for illustrative purposes. As previously indicated, additional or fewer processor-hub interconnections may be implemented depending upon system resources and requirements. Each processor-hub interconnection 226 of the one or more processor-hub interconnections 226-1-226-N may include various components and/or aspects. While some of these components and/or aspects are described with reference to the first processor-hub interconnection 226-1, each of the remaining processor-hub interconnections 226-2-226-N may include the same or similar components and/or aspects discussed with reference to the first processor-hub interconnection 226-1.

As shown in FIG. 2, the I/O hub 228 may, in some aspects, include a first hub-processor interface 264-1, a second hub-processor interface 264-2, a graphics interface 266, and/or a hub-hub interface 268. Although the first hub-processor interface 264-1, the second hub-processor interface 264-2, the graphics interface 266, and/or the hub-hub interface 268 are illustrated within the I/O hub 228 of FIG. 2, some aspects may employ additional or fewer hub-processor interfaces, graphics interfaces, hub-hub interfaces, and/or other elements. For instance, the I/O hub 228 may, in some aspects, include a processor (e.g., microprocessor) and one or more memories. For improved latency characteristics, I/O hub 228 may be merged onto one or more processors 102-1-102-N in accordance with at least one alternative aspect.

With continued reference to FIG. 2, the first hub-processor interface 264-1 and the second hub-processor interface 264-2 may be generally referred to herein as "one or more hub-processor interfaces 264-1-264-N," "hub-processor interfaces 264" and more generally "hub-processor interfaces 264." Although two hub-processor interfaces 264 are shown in FIG. 2, this number is merely selected for illustrative purposes. As previously indicated, additional or fewer hub-processor interfaces may be implemented depending upon system resources and requirements. Each hub-processor interface 264 of the one or more hub-processor interfaces 264-1-264-N may include various components and/or aspects. While some of these components and/or aspects are described with reference to the first hub-processor interface 264-1, each of the remaining hub-processor interfaces 264-2-264-N may include the same or similar components and/or aspects discussed with reference to the first hub-processor interface 264-1.

As shown in FIG. 2, the each processor 102 of the one or more processors 102-1-102-N may include various interfaces. For instance, the first processor 102-1 may, in some aspects, include the first processor-processor interface 262-1, which is configured to support the bidirectional transfer of data with the processor-processor interface 262-2 of the second processor 102-2 via the processor-processor interconnection 224. As previously indicated, additional or fewer processor-processor interconnections 224 may be implemented depending upon system resources and requirements. According to at least one aspect, the first processor 102-1 may include the first processor-hub interface 260-1, which is configured to support the bidirectional transfer of data with the first hub-processor interface 264-1 of the I/O hub 228 via the first processor-hub interconnection 226-1. Processor-processor interconnections 224 and processor-hub interconnections 226 may, in some aspects be distinct instances of a common set of interconnections. In at least one aspect, the processor-processor interconnections 224 may differ from the processor-hub interconnections 226.

In some aspects, the I/O hub 228 may be configured to perform various communications. According to at least one aspect, the I/O hub 228 may be configured to communicate with the first processor-hub interface 260-1 through the first hub-processor interface 264-1. For instance, the first hub-processor interface 264-1 may be configured to support the communication of I/O request(s) for a cache block(s) of cache 112-1 to the first processor-hub interface 260-1. The I/O hub 228 may, in some aspects, be configured to communicate with the graphics adapter 232 through the graphics interface 266 and the graphics interconnection 230. In at least one aspect, the graphics interconnection 230 may be implemented as a high-speed serial bus. For instance, the graphics interconnection 230 may be implemented as a peripheral component interconnect express (PCIe) bus or another type of bus. According to some aspects, I/O hub 228 may be configured to communicate with the bus bridge hub 236 through the hub-hub interface 268 and the hub-hub interconnection 234.

With continued reference to FIG. 2, the bus bridge hub 236 may be configured to support a variety of bus protocols for different types of I/O devices or peripheral devices. In some aspects, the bus bridge hub 236 may be configured to communicate over the general purpose serial communication bus 238 to support various I/O devices 240. According to at least one aspect, the general purpose serial communication bus 238 may be implemented as a universal serial bus (USB), PCI, PCIe, NVM Express (NVMe), NVMe over fabric (NVMeoF), etc.

With continued reference to FIG. 2, the bus bridge hub 236 may, in some aspects be configured to communicate over the low bandwidth bus 242 to support legacy interfaces, referred to herein as the desktop I/O devices 244. According to at least one aspect, the low bandwidth bus may be implemented as a Low Pin Count (LPC) bus, Inter-Integrated Circuit (I2C) bus, or an Industry Standard Architecture (ISA) bus, etc. Desktop I/O devices 244 may, in some aspects, include interfaces for a keyboard, mouse, serial port, parallel port, and/or a removable media drive. In at least one aspect, the low bandwidth bus 242 includes an interface for the NVM device 246 (e.g., flash ROM).

With continued reference to FIG. 2, bus bridge hub 236 may, in some aspects be configured to communicate over the storage protocol bus 248 to support the persistent storage device 250 and/or SSD 252. According to at least one aspect, the storage protocol bus 248 may be implemented as a serial AT attachment (SATA) bus, or small computer system interface (SCSI) bus, etc. The persistent storage device 250 may, in some aspects, be implemented as a magnetic-core hard disk drive (HDD).

As shown in FIG. 2, the persistent storage device 250 may, in some aspects, include store code 270. Although the store code 270 is illustrated within the persistent storage device 250 of FIG. 2, some aspects may employ additional and/or different types of code, and/or other elements. According to at least one aspect, the store code 270 may include data representing processor-executable instructions. Processor-executable instructions may, in some aspects, include operating system instructions, application program instructions, and so forth, that, when executed by the processor, cause the processor to perform one or more of the operations described herein.

With continued reference to FIG. 2, the bus bridge hub 236 may, in some aspects be configured to communicate with the NIC 254. According to at least one aspect, NIC 254 may be configured to implement a packet-switched network communication protocol. The packet-switched network communication protocol may, in some aspects, be a Gigabit Ethernet network communication protocol. In at least one aspect, the Gigabit Ethernet network communication protocol is be defined by the IEEE 802.3-2008 standard.

Although specific instances of communication busses and bus targets have been illustrated and described, some aspects may employ different communication busses and different target devices.

Figure 3:
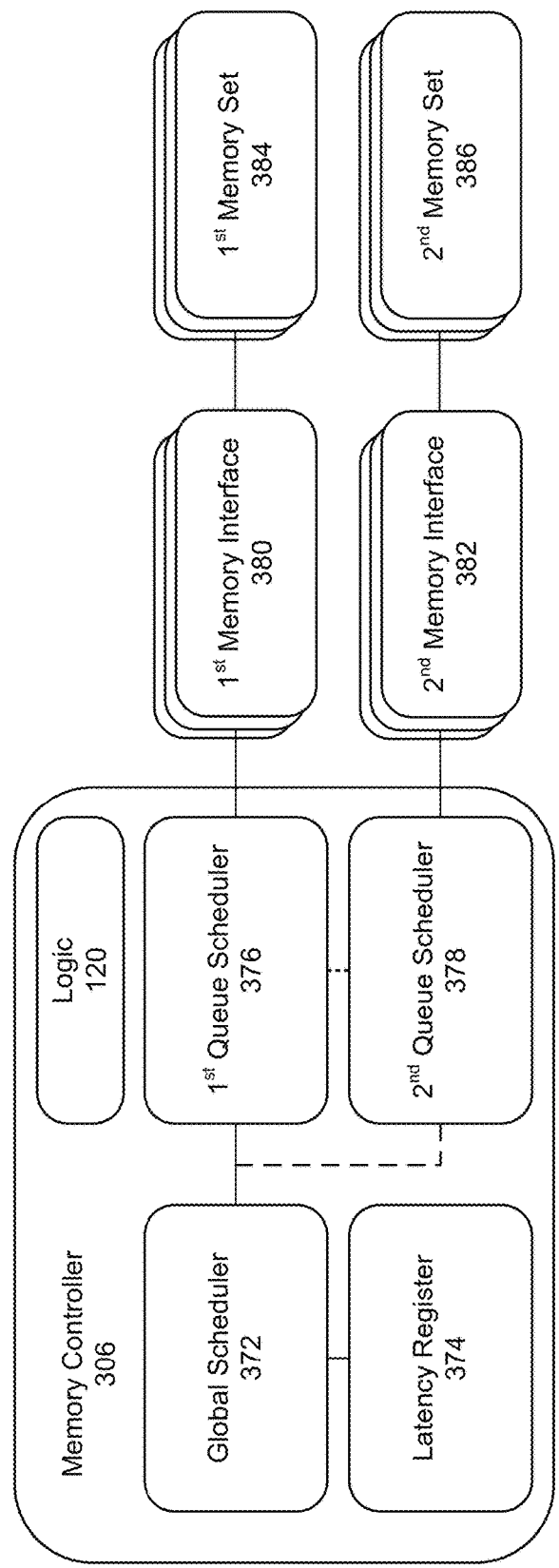
FIG. 3 shows a logical representation of a first memory controller system having a diverse multi-channel mode configuration.

FIG. 3 shows a first logical representation of a memory controller system 300 having a diverse multi-channel mode configuration. As shown in FIG. 3, system 300 may include memory controller 306, a first memory set interface 380, a second memory set interface 382, a first memory set 384 and/or a second memory set 386. Although the memory controller 306, the first memory set interface 380, the second memory set interface 382, the first memory set 384 and/or the second memory set 386 are illustrated in the system 300 of FIG. 3, some aspects may employ additional or fewer memory controllers, memory interfaces, memory sets and/or other elements. For instance, one or more components and/or aspects associated described with respect to system 300 of FIG. 3 may be incorporated into the system 100 of FIG. 1 and/or system 200 of FIG. 2.

As shown in FIG. 3, memory controller 306 may include logic 120, a global scheduler 372, a latency register 374, a first queue scheduler 376, and/or a second queue scheduler 378. Although the logic 120, the global scheduler 372, the latency register 374, the first queue scheduler 376, the second queue scheduler 378, and logic 120 are illustrated in the memory controller 306 of FIG. 3, some aspects may employ additional or fewer global schedulers, the latency registers, queue schedulers, and logic and/or other elements. For instance, one or more components and/or aspects described with respect to the memory controller 106 of FIG. 1 and/or one or more memory controllers 206 of FIG. 2 may be incorporated into the memory controller 306, either individually, collectively or a combination thereof.

With continued reference to FIG. 3, logic 120 of the memory controller 306 may include a set of processor executable instructions, which when executed by one or more processors 102-1-102-N of FIG. 1 or 2 causes the one or more processors 102-1-102-N of FIG. 1 or 2 to implement the global scheduler 372, first queue scheduler 376, and/or second queue scheduler 378. In some aspects, the global scheduler 372 may be configured to read data from the latency register 374. According to at least one aspect, the global scheduler 372 may be configured to read data from the latency register 374 at a predetermined schedule. The predetermined schedule may, in some aspects, be a predetermined time interval.

In some aspects, the latency register 374 may be configured to store data that indicates an amount of time the global scheduler 372 is set to process requests in the first queue scheduler 376 targeting the first memory set 384 and/or the second queue scheduler 378 targeting a second memory set 386. According to at least one aspect, this amount of time may be represented as a number of clock cycles the global scheduler 372 is set to process requests in the first queue scheduler 376 targeting the first memory set 384 and/or the second queue scheduler 378 targeting the second memory set 386. The number of clock cycles may, in some aspects, be defined as a ratio of clock cycles spent global scheduler 372 is set to process requests in the first queue scheduler 376 targeting the first memory set 384 before switching to the second queue scheduler 378 targeting the second memory set 386.

In some aspects, the latency register 374 may be loaded with a default value from a manufacturer. For instance, the default value may be set an equal amount of time (e.g., number of clock cycles) between requests in the first queue scheduler 376 targeting the first memory set 384 and/or the second queue scheduler 378 targeting a second memory set 386. According to at least one aspect, latency register 374 may, in some aspects, may be set and/or updated using a basic input/output system (BIOS) platform configuration. An update to the latency register, in some aspects, may be used to decrease the latency of processing requests in the first queue scheduler 376 and increase the latency of processing requests in the second queue scheduler 378, or vice versa. In at least one aspect, this type of weighting may result an improved utilization of the one or more processors 102-1-102-N of FIG. 1 or 2 when too much bandwidth is allocated to first queue scheduler 376 or the second queue scheduler 378. While the general performance characteristics may generally be known, traffic of requests targeting the first memory set 384 and the second memory set 386 may influence the effectiveness of such weighting.

With continued reference to FIG. 3, the global scheduler 372 may, in some aspects, be configured to control the first queue scheduler 376 to issue one or more requests, in accordance with the timing allocation indicated by the latency register 374, to the first memory set 384. According to at least one aspect, the first queue scheduler 376 may be coupled to the first memory set interface 380 via a first memory interconnection (e.g., memory interconnection 222). The first memory interconnection may, in some aspects, be included within a first memory bus that is compliant with a first interface specification (e.g., SDR, DDR, QDR). In at least one aspect, the one or more requests may be provided to the first memory set 384 through the first memory interconnection over a first channel (e.g., channel A, channel B, etc.). According to some aspects, the memory controller 306 may be configured to issue requests over the second channel in a single channel mode or a dual-channel mode. The first queue scheduler 376 may be a first rotating priority queue (RPQ) scheduler in accord with at least one aspect.

In some aspects, the first memory set interface 380 may be implemented as a first dual in-line memory module (DIMM) socket. According to at least one aspect, the first DIMM socket may be compliant with the first interface specification. The first DIMM socket may, in some aspects, include one or more first connections and/or posts, which are configured to couple with a printed circuit board (PCB) (e.g., motherboard). In at least one aspect, the first DIMM socket may include a slot configured to receive the first memory set 384. According to some aspects, the first DIMM socket may be configured to mate with a first DIMM module that includes the first memory set 384.

In some aspects, the first memory set 384, may be any type of memory described herein. According to at least one aspect, the first memory set 384 may include a set of volatile memory. The first memory set 384 may, in some aspects, be included within the first DIMM module (e.g., DDR DRAM) that complies with the first interface specification. In at least one aspect, the first DIMM module may include a plurality of pins configured to mate with the first DIMM socket. The first memory set 384 may be configured to return data to the memory controller 306 in response to receiving the one or more requests from the first queue scheduler 376.

With continued reference to FIG. 3, the global scheduler 372 may, in some aspects, be configured to control the second queue scheduler 378 to issue one or more requests, in accordance with the timing allocation indicated by the latency register 374, to the second memory set 386. According to at least one aspect, the second queue scheduler 378 may be coupled to the second memory set interface 382 via a second memory interconnection (e.g., memory interconnection 222). The second memory interconnection may, in some aspects, be included in a second memory bus that is the same or different from the first memory bus. For instance, the second memory bus may be compliant with a second interface specification (e.g., a DDR-Transactional (DDR-T), an NVM Programming Model, etc.), which is different from the first interface specification. In at least one aspect, the one or more requests may be provided to the second memory set 386 through the second memory interconnection over a second channel (e.g., channel A, channel B, etc.). According to some aspects, the memory controller 306 may be configured to issue requests over the second channel in a single channel mode or a dual-channel mode. The second queue scheduler 378 may be a second RPQ scheduler in accord with at least one aspect.

In some aspects, the second memory set interface 382 may be implemented as a second DIMM socket. According to at least one aspect, the second DIMM socket may include one or more second connections and/or posts, which are configured to couple to the PCB (e.g., motherboard). The second DIMM socket may, in some aspects, include a second slot configured to receive the second memory set 386. In at least one aspect, the second DIMM socket may be configured to mate with a second DIMM module that includes the second memory set 386. According to some aspects, the first DIMM socket and the second DIMM socket may be the same type of DIMM socket (e.g., DDR4).

In some aspects, the second memory set 386, may be any type of memory described herein. According to at least one aspect, the second memory set 386 may include a set of non-volatile memory. The second memory set 386 may, in some aspects, be included within the second DIMM module (e.g., NVDIMM module) that complies with the second interface specification (e.g., DDR-T, NVM Programming Model, etc.). In at least one aspect, the second DIMM module may include a plurality of pins configured to mate with the first DIMM socket. The second memory set 386 may be configured to return data to the memory controller 306 in response to receiving the one or more requests from the second queue scheduler 378.

In some aspects, the first channel and second channel may be a common channel (e.g., A). According to at least one aspect, the global scheduler 372 may be configured to control the first queue scheduler 376 to issue, over the common channel, the one or more requests to the first memory set 384 (e.g., DDR DRAM) in accordance with the timing allocation indicated by the latency register 374 and the first interface specification (e.g., DDR). The global scheduler 372 may, in some aspects, be configured to control the second queue scheduler 378 to issue, over the common channel, the one or more requests to the second memory set 386 (e.g., 3D XPoint memory) in accordance with the timing allocation indicated by the latency register 374 and the second interface specification (e.g., DDR-T). The first memory set 384 may be configured to return data to the memory controller 306 in response to receiving the one or more requests from the first queue scheduler 376. The second memory set 386 may be configured to return data to the memory controller 306 in response to receiving the one or more requests from the second queue scheduler 378.

Figure 4:
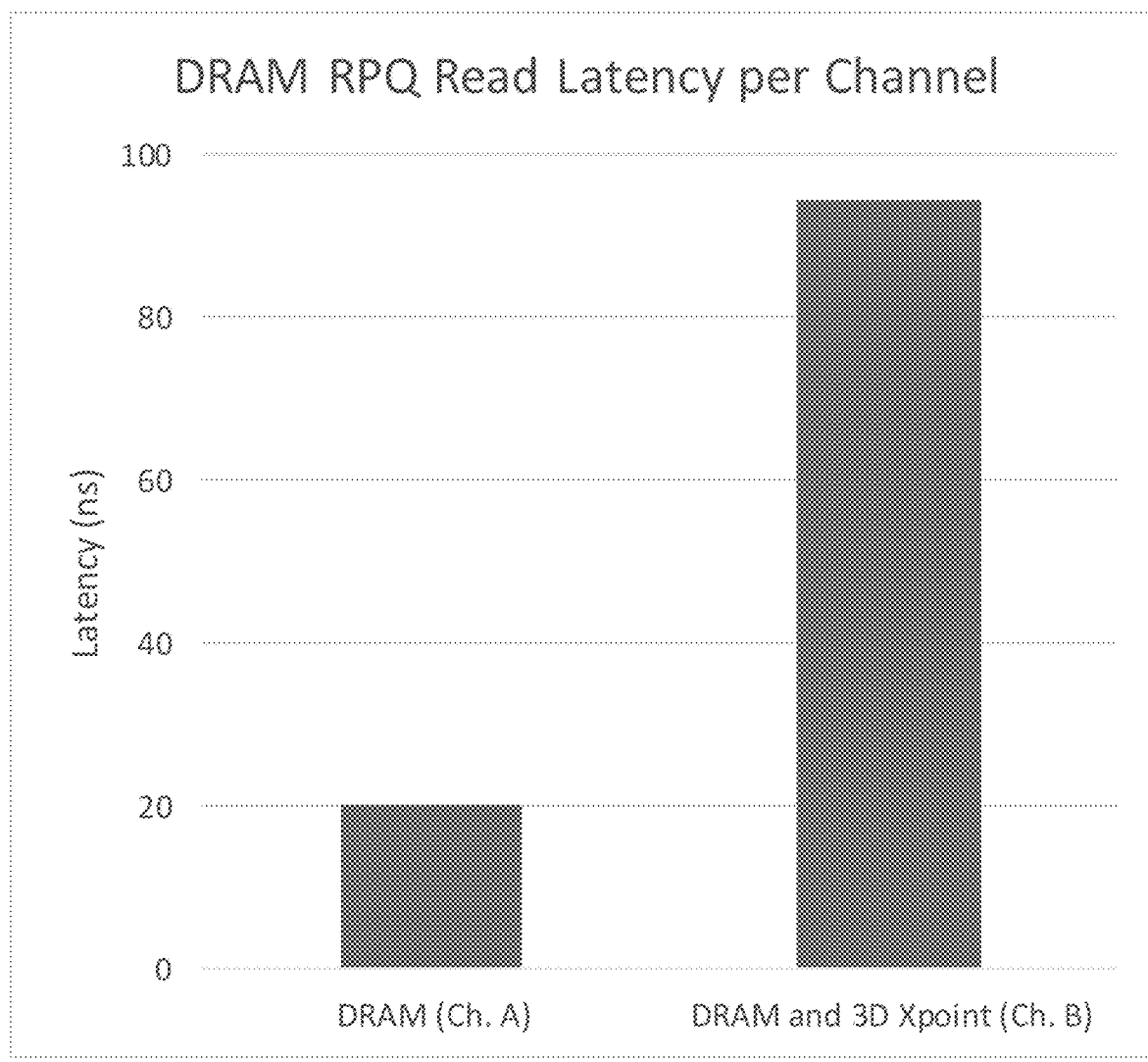
FIG. 4 shows a bar graph comparing the read latency of the first queue scheduler in two exemplary dual-channel mode configurations of the first memory controller system.

FIG. 4 shows a bar graph 400 comparing the read latency of the first queue scheduler 376 in two exemplary dual-channel mode configurations of system 300. In a first dual-channel mode configuration, first memory set 384 and second memory set 386 each included a DDR DRAM DIMM module. By contrast, the first memory set 384 included a DDR DRAM DIMM module, whereas the second memory set 386 included a DDR-T 3D XPoint NVMDIMM module in a second dual-channel mode configuration. For both configurations, the latency register was set to provide the global scheduler 372 an equal amount of time to process requests in the first queue scheduler 376 and the second queue scheduler 378.

As shown in FIG. 4, read latency was recorded in nanoseconds (ns) for the first queue scheduler 376 in both configurations. A higher read latency was recorded in the first queue scheduler 376 for the second channel dual-mode configuration than the first dual-channel mode configuration. The presence of DDR-T traffic in the second queue scheduler 378 is believed to cause the increase in latency within the first queue scheduler 376 for the second dual-channel mode configuration.

In view of this information, dynamic switching techniques may, in some aspects, be incorporated in system 300 as described with respect to FIGS. 5-10 to offer a tradeoff between latency and bandwidth. Provided the approach described with respect to FIGS. 5-10, an increased granularity in switching between traffic in the first queue scheduler 376 and second queue scheduler 378 may offer an improved utilization of resources. Furthermore, traffic going to the first queue scheduler 376 and second queue scheduler 378 described with respect to FIGS. 5-10, may provide the memory controller 306 with information to adapt its behavior for increased performance.

Figure 5:
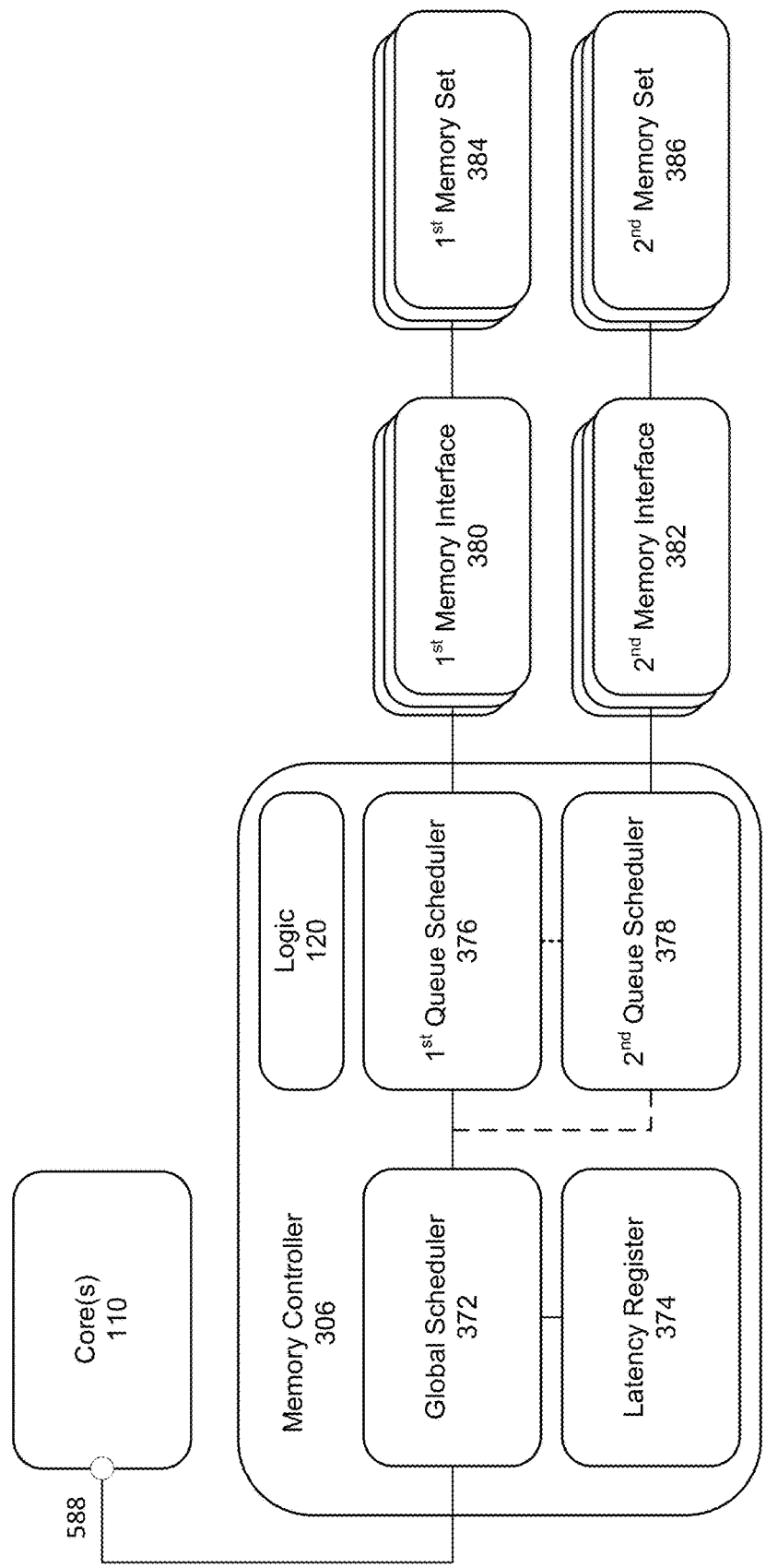
FIG. 5 shows a logical representation of a first memory controller system having a dynamic multi-channel mode configuration.

FIG. 5 shows a first logical representation of a memory controller system 500 having a dynamic multi-channel mode configuration. As shown in FIG. 5, system 500 may include one or more processing cores 110-1-110-M, a memory controller 306, a first memory set interface 380, a second memory set interface 382, a first memory set 384, a second memory set 386, and/or a one or more processor interfaces 588. Where previously described, one or more aforementioned aspects of such elements may be incorporated with respect to FIG. 5, either individually, collectively, or any combination thereof. Although the one or more processing cores 110-1-110-M, memory controller 306, the first memory set interface 380, the second memory set interface 382, the first memory set 384, the second memory set 386 and the one or more processor interfaces 588 are illustrated in the system 500 of FIG. 5, some aspects may employ additional or fewer processing cores, memory controllers, memory interfaces, memory sets and/or other elements. Furthermore, one or more components and/or aspects associated described with respect to system 500 of FIG. 5 may be incorporated into the system 100 of FIG. 1 and/or system 200 of FIG. 2.

As shown in FIG. 5, memory controller 306 may include logic 120, a global scheduler 372, a latency register 374, a first queue scheduler 376, and/or a second queue scheduler 378. Where previously described, one or more aforementioned aspects of such elements may be incorporated with respect to FIG. 5, either individually, collectively, or any combination thereof. Although the logic 120, the global scheduler 372, the latency register 374, the first queue scheduler 376, and the second queue scheduler 378 are illustrated in the memory controller 306 of FIG. 5, some aspects may employ additional or fewer global schedulers, the latency registers, queue schedulers, and logic and/or other elements.

As previously noted, logic 120 of the memory controller 106 may include a set of processor executable instructions, which when executed by one or more processors 102-1-102-N causes the one or more processors 102-1-102-N to implement the global scheduler 372 first queue scheduler 376, and/or second queue scheduler 378.

In some aspects, a first queue scheduler 376 may be configured to issue, in accordance with a first timing scheme, one or more requests in the first queue scheduler 376 to the first memory set 384 via the first memory set interface 380. According to at least one aspect, the one or more requests in the first queue scheduler 376 may include a read request targeting the first memory set 384 and/or a write request targeting the first memory set 384. The second queue scheduler 378 may, in some aspects, be configured to issue, in accordance with a second timing scheme, one or more requests in the second queue scheduler 378 to the second memory set 384 via the second memory set interface 382. In at least one aspect, the one or more requests in the second queue scheduler 378 may include a read request targeting the second memory set 386 and/or a write request targeting the second memory set 386.

In some aspects, the global scheduler 372 may be configured to generate the first timing scheme. According to at least one aspect, the global scheduler 372 may be configured to generate the first timing scheme based on data read from the latency register 374, the one or more requests in the first queue scheduler 376, one or more request to be included in the first queue scheduler 376, the one or more requests in the second queue scheduler 378, and/or one or more requests to be included in the second queue scheduler 378. The one or more requests to be included in the first queue scheduler 376 may, in some aspects, include a read request targeting the first memory set 384 and/or a write request targeting the first memory set 384.

In some aspects, the global scheduler 372 may be configured to modify the first timing scheme based on data read from the latency register 374, the one or more requests in the first queue scheduler 376, one or more request to be included in the first queue scheduler 376, the one or more requests in the second queue scheduler 378, and/or one or more requests to be included in the second queue scheduler 378. According to at least one aspect, the global scheduler 372 may be configured to provide the first timing scheme to the first queue scheduler 376 and/or the second queue scheduler 378. The global scheduler 372 may, in some aspects be configured to provide the modified first timing scheme to the first queue scheduler 376 and/or the second queue scheduler 378.

In some aspects, the global scheduler 372 may be configured to generate the second timing scheme. According to at least one aspect, the global scheduler 372 may be configured to generate the second timing scheme based on data read from the latency register 374, the one or more requests in the first queue scheduler 376, one or more request to be included in the first queue scheduler 376, the one or more requests in the second queue scheduler 378, and/or one or more requests to be included in the second queue scheduler 378. The one or more requests to be included in the second queue scheduler 376 may, in some aspects, include a read request targeting the second memory set 386 and/or a write request targeting the second memory set 386.

In some aspects, the global scheduler 372 may be configured to modify the second timing scheme data read from the latency register 374, the one or more requests in the first queue scheduler 376, one or more request to be included in the first queue scheduler 376, the one or more requests in the second queue scheduler 378, and/or one or more requests to be included in the second queue scheduler 378. According to at least one aspect, the global scheduler 372 may be configured to provide the second timing scheme to the first queue scheduler 376 and/or the second queue scheduler 378. The global scheduler 372 may, in some aspects, be configured to provide the modified second timing scheme to the first queue scheduler 376 and/or the second queue scheduler 378.

In some aspects, the global scheduler 372 may be configured to generate a global timing scheme including the first timing scheme and the second timing scheme. According to at least one aspect, the global scheduler 372 may be configured to generate the global timing scheme based on data read from the latency register 374, the first timing scheme based on the one or more requests in the first queue scheduler 376 and/or the one or more requests in the second queue scheduler 378. The global scheduler 372 may, in some aspects, be configured to modify the global timing scheme based on based on data read from the latency register 374, the first timing scheme based on the one or more requests in the first queue scheduler 376 and/or the one or more requests in the second queue scheduler 378. In at least one aspect, the global scheduler 372 may be configured to provide the global timing scheme and/or the modified global timing scheme to the first queue scheduler 376 and/or the second queue scheduler 378.

In some aspects, the memory controller 306 may be configured to issue, in accordance with the modified first timing scheme, one or more requests in the first queue scheduler 376 to the first memory set 384 via the first memory set interface 380. According to at least one aspect, the memory controller 306 may be configured to issue, in accordance with the modified second timing scheme, one or more requests in the second queue scheduler 378 to the second memory set 386 via the second memory set interface 382. The memory controller 306 may, in some aspects, be configured to issue, in accordance with the modified global timing scheme, at least one of the one or more requests in the first queue scheduler 376 to the first memory set 384 via the first memory set interface 380 or the one or more requests in the second queue scheduler 378 to the second memory set 386 via the second memory set interface 382.

With continued reference to FIG. 5, a component (e.g., memory controller 306) of any of the systems 100, 200, 300, and/or 500 may, for instance, include a clock. In some aspects, the first timing scheme may define a first number of cycles of the clock in which the one or more requests in the first queue scheduler 376 are to be issued, during a first duration, to the first memory set 384 via the first memory set interface 380. According to at least one aspect, the second timing scheme may define a second number of cycles of the clock in which the one or more requests in the second queue scheduler 378 are to be issued, during a second duration, to the second memory set 386 via the second memory set interface 382. The first timing scheme may further define a third number of cycles of the clock in which the one or more requests in the first queue scheduler 376 are to be issued, during a third duration, to the first memory set 384 via the first memory set interface 380. In at least one aspect, the second timing scheme may define a fourth number of cycles of the clock in which the one or more requests in the second queue scheduler 378 are to be issued, during the fourth duration, to the second memory set 386 via the second memory set interface 382.

In some aspects, the global scheduler 372 may be configured to modify the first timing scheme by adjusting the first number of cycles of the clock in which the one or more requests in the first queue scheduler 376 are to be issued to the first memory set 384 via the first memory set interface 380. According to at least one aspect, the global scheduler 372 may be configured to modify the second timing scheme by adjusting the second number of cycles of the clock in which the one or more requests in the second queue scheduler 376 are to be issued to the second memory set 386 via the second memory set interface 382. The global scheduler 372 may, in some aspects, be configured to modify the global timing scheme by adjusting at least one of the first number of cycles of the clock in which the one or more requests in the first queue scheduler 376 are to be issued to the first memory set 384 via the first memory set interface 380 or adjusting the second number of cycles of the clock in which the one or more requests in the second queue scheduler 376 are to be issued to the second memory set 386 via the second memory set interface 382.

In some aspects, the number of cycles respectively defining of the first through fourth durations may be equal. According to at least one aspect, the number of cycles respectively defining the first through fourth durations may be different. The number of cycles respectively defining the first through fourth durations may, in some aspects, be the same among one or more of the first through fourth durations and different among one or more of the first through fourth durations.

In some aspects, the first through fourth durations may be logically and/or temporally ordered. In some aspects, the first through fourth durations may be sequential in any order. For instance, this may include a sequence of any order including the repeating (e.g., periodically) of one or more of the first through fourth durations. According to at least one aspect, the first through fourth durations may be consecutive in any order. The first through fourth durations may, in some aspects, be sequential with a guard interval interposed between two or more of these durations. In at least one aspect, the first through fourth durations may, in some aspects, be sequential with an overlap between two or more of these durations. Although specific implementations of the first through fourth durations have been described, the present disclosure is not necessarily limited to these aspects and may include more or less durations.

In some aspects, the first memory set 384 and second memory set 386 may be configured to return data in response to one or more requested received therein. According to at least one aspect, the first memory set 384 may, in some aspects, be configured to return data to the memory controller 306 in response to receiving the one or more requests from the first queue scheduler 376. The second memory set 386 may, in some aspects, be configured to return data to the memory controller 306 in response to receiving the one or more requests from the first queue scheduler 376.

With continued reference to FIG. 5, the global scheduler 372 may, for instance, be configured to determine whether one or more requests in the first queue scheduler 376 meet a capacity criteria for the first queue scheduler 376. In some aspects, the capacity criteria for the first queue scheduler 376 may be met when a sum of the one or more requests in the first queue scheduler is greater than or equal to a capacity threshold for the first queue scheduler 376. According to at least one aspect, the capacity threshold for the first queue scheduler 376 may be a percentage of a total capacity of the first queue scheduler 376.

In some aspects, the global scheduler 372 may be configured to modify the first timing scheme based on the capacity criteria for the first queue scheduler 376 being met. According to at least one aspect, the global scheduler 372 may be configured to modify the first timing scheme by adjusting the number of cycles of the clock in which the one or more requests in the first queue scheduler 376 are to be issued to the first memory set 384 via the first memory set interface 380, based on the capacity criteria for the first queue scheduler 376 being met.

With continued reference to FIG. 5, the global scheduler 372 may, for instance, be configured to determine whether one or more requests in the second queue scheduler 378 meet a capacity criteria for the second queue scheduler 378. In some aspects, the capacity criteria for the second queue scheduler 378 may be met when a sum of the one or more requests in the second queue scheduler is greater than or equal to a capacity threshold for the second queue scheduler 378. According to at least one aspect, the capacity threshold for the second queue scheduler 378 may be a percentage of a total capacity of the second queue scheduler 378.

In some aspects, the global scheduler 372 may be configured to modify the second timing scheme based on the capacity criteria for the second queue scheduler 378 being met. According to at least one aspect, the global scheduler 372 may be configured to modify the second timing scheme by adjusting the second number of cycles of the clock in which the one or more requests in the second queue scheduler 378 are to be issued to the second memory set 386 via the second memory set interface 382, based on the capacity criteria for the second queue scheduler 378 being met.

With continued reference to FIG. 5, each of the one or more processing cores 110-1-110-M may include a core interface 588. Although the core interface 588 may be included each of the one or more processing cores 110-1-110-M of the system 500 of FIG. 5, some aspects may employ additional or fewer interfaces and/or other elements. As previously noted, one or more components and/or aspects described with respect to the one or more processing cores 110-1-110-M of FIGS. 1 and/or 2 may be incorporated into the one or more processing cores 110-1-110-M of FIG. 5, either individually, collectively or a combination thereof.

With continued reference to FIG. 5, the one or more core interfaces 588-1-588-M may be generally referred to herein as "core interfaces 588" and more generally "core interface 588." Each core interface 588 of the one or more core interfaces 588-1-588-M may include various components and/or aspects. While some of these components and/or aspects are described with reference to core interface 588-1, each of the remaining core interfaces 588-2-588-M may include the same or similar components and/or aspects discussed with reference to the core interface 588-M.

In some aspects, each core interface 588 of the one or more core interfaces 588-1-588-M may be implemented in various manners. According to at least one aspect, each core interface 588 of the one or more core interfaces 588-1-588-M may be an interface to an Industry Standard Architecture (ISA) interconnection. Each core interface 588 of the one or more core interfaces 588-1-588-M may, in some aspects, be an interface to a model specific register (MSR). Although specific implementations of the one or more core interfaces 588-1-588-M have been described, the present disclosure is not necessarily limited to these aspects.

In some aspects, the each processor 110 of the one or more processing cores 110-1-110-M may be able to provide information to the memory controller 306 via a core interface 588. According to at least one aspect, each core interface 588 of the one or more core interfaces 588-1-588-M may, for instance, provide the information to the software stack of the system 500. As previously noted, the software stack of the system 500 may include the logic 120 implemented by the memory controller 306. The memory controller 306 may, in some aspects, be exposed to the information provided by the one or more processing cores 110-1-110-M.

In some aspects, the information provided by the one or more processing cores 110-1-110-M via the one or more core interfaces 588-1-588-M may include various types of information. According to some aspects, the information provided by the one or more processing cores 110-1-110-M via the one or more core interfaces 588-1-588-M may relate to the one or more requests to be included in the first queue scheduler 376. The information provided by the one or more processing cores 110-1-110-M via the one or more core interfaces 588-1-588-M may relate to the one or more requests to be included in the second queue scheduler 378.

With continued reference to FIG. 5, logic 120, store code 270, or another portion of the software stack of system 500 may, in some aspects, include a set of processor executable instructions, which when executed by one or more processors 102-1-102-N causes the one or more processors 102-1-102-N to perform one or more operations. According to at least one aspect, the one or more operations may be a read hint operation. The one or more operations may, in some aspects, include a RPQ hint operation.

The read hint operation may, in some aspects, include reading a hint associated with one or more requests (e.g., read requests or write requests) targeting at least one of the first memory set 384 or the second memory set 386. According to at least one aspect, the read hint operation may expose information about the one or more requests to be included in at least one of the first queue scheduler 376 or the second queue scheduler 378 to the memory controller 306 via the one or core interface 588-1-588-M. The exposed information may, in some aspects, include capacity information and/or criticality information about one or more requests to be included in at least one of the first queue scheduler 376 or the second queue scheduler 378.

The read hint operation may, in some aspects, be logically implemented as Read(@X, NextReadHint). In at least one aspect, the read hint operation may expose information about one or more requests to be included in at least one of the first queue scheduler 376 or the second queue scheduler 378. According to at least one aspect, the exposed information may relate to an auxiliary capacity of at least one of the first queue scheduler 376 or the second queue scheduler 378. The exposed information may, in some aspects, relate to a criticality of one or more requests within a particular stream of requests (e.g., read requests) to be included in at least one of the first queue scheduler 376 or the second queue scheduler 378. In at least one aspect, the exposed information may indicate a number of cycles of the clock that can be tolerated by a particular location of the stream based on a where a particular request of the stream belongs with respect to a next request of the stream.

In some aspects, the global scheduler 372 may be configured to determine whether one or more requests to be included in the first queue scheduler 376 meet an auxiliary capacity criteria for the first queue scheduler 376. According to at least one aspect, the auxiliary capacity criteria for the first queue scheduler 376 may be met when a sum of the one or more requests to be included in the first queue scheduler 376 is greater than or equal to an auxiliary capacity threshold for the first queue scheduler 376. The auxiliary capacity threshold for the first queue scheduler 376 may, in some aspects, be equal to the capacity threshold for the first queue scheduler 376 minus the sum of the one or more requests to be included in the first queue scheduler 376. In at least one aspect, the auxiliary capacity threshold for the first queue scheduler 376 may, in some aspects, be equal to the capacity threshold for the first queue scheduler 376 minus the sum of the one or more requests to be included in the first queue scheduler 376 plus a capacity threshold for the second queue scheduler 378 minus the sum of the one or more requests to be included in the second queue scheduler 378.

In some aspects, the global scheduler 372 may be configured to modify the first timing scheme based on the auxiliary capacity for the first queue scheduler 376 being met. According to at least one aspect, the global scheduler 372 may be configured to modify the first timing scheme by adjusting the first number of cycles of the clock in which the one or more requests in the first queue scheduler 376 are to be issued to the first memory set 384 via the first memory set interface 380, based on the auxiliary capacity criteria for the first queue scheduler 376 being met.

In some aspects, the global scheduler 372 may be configured to determine whether one or more requests to be included in the second queue scheduler 378 meet an auxiliary capacity criteria for the second queue scheduler 378. According to at least one aspect, the auxiliary capacity criteria for the second queue scheduler 378 may be met when a sum of the one or more requests to be included in the second queue scheduler 378 is greater than or equal to an auxiliary capacity threshold for the second queue scheduler 378. The auxiliary capacity threshold for the second queue scheduler 378 may, in some aspects, be equal to the capacity threshold for the second queue scheduler 378 minus the sum of the one or more requests to be included in the second queue scheduler 378. In at least one aspect, the auxiliary capacity threshold for the second queue scheduler 378 may, in some aspects, be equal to the capacity threshold for the first queue scheduler 376 minus the sum of the one or more requests to be included in the first queue scheduler 376 plus a capacity threshold for the second queue scheduler 378 minus the sum of the one or more requests to be included in the second queue scheduler 378.

In some aspects, the global scheduler 372 may be configured to modify the second timing scheme based on the auxiliary capacity for the second queue scheduler 378 being met. According to at least one aspect, the global scheduler 372 may be configured to modify the second timing scheme by adjusting the second number of cycles of the clock in which the one or more requests in the second queue scheduler 378 are to be issued to the first memory set 384 via the first memory set interface 380, based on the auxiliary capacity criteria for the second queue scheduler 378 being met. The auxiliary capacity threshold for the first queue scheduler 376 may, in some aspects, be less than or equal to the auxiliary capacity threshold for the second queue scheduler 378. In at least one aspect, the auxiliary capacity threshold for the first queue scheduler 376 may, in some aspects, be greater than or equal to the auxiliary capacity threshold for the second queue scheduler 378.

In some aspects, the global scheduler 372 may be configured to determine whether a first request of the one or more requests to be included in the first queue scheduler 376 meets a first priority level criteria. According to at least one aspect, the first priority level criteria may be met when the first request is to be processed by the memory controller 306 within a threshold number of instructions to be processed by the memory controller 306. The first priority level criteria may, in some aspects, be met when a target address, to which the first request refers, will be accessed by the memory controller 306 within the threshold number of instructions to be processed by the memory controller 306. In at least one aspect, the first priority level may be met when the target address, to which the first request refers, is associated with a latency sensitive application. According to some aspects, the first priority level may be met when the target address, to which the first request refers, is associated with a latency resilient application.

In some aspects, the global scheduler 372 may be configured to modify at least one of the first timing scheme or the second timing scheme based on the first priority level criteria being met. According to at least one aspect, the global scheduler 372 may be configured to modify the first timing scheme by adjusting the first number of cycles of the clock in which the one or more requests in the first scheduler 376 are to be issued to the first memory set 384 via the first memory set interface 380, based on the first priority level being met. The global scheduler 372 may, in some aspects, be configured to modify the second timing scheme by adjusting the second number of cycles of the clock in which the one or more requests in the second queue scheduler 378 are to be issued to the second memory set 386 via the second memory set interface 382, based on the first priority level criteria being met.

In some aspects, the global scheduler 372 may be configured to determine whether a second request of the one or more requests to be included in the second queue scheduler 378 meets a second priority level criteria. According to at least one aspect, the second priority level criteria may be met when the second request is to be processed by the memory controller 306 within the threshold number of instructions to be processed by the memory controller 306. The second priority level criteria may, in some aspects, be met when a target address, to which the second request refers, will be accessed by the memory controller 306 within the threshold number of instructions to be processed by the memory controller 306. In at least one aspect, the second priority level may be met when the target address, to which the second request refers, is associated with a latency sensitive application. According to some aspects, the second priority level may be met when the target address, to which the second request refers, is associated with a latency resilient application.

In some aspects, the global scheduler 372 may be configured to modify at least one of the first timing scheme or the second timing scheme based on the second priority level criteria being met. According to at least one aspect, the global scheduler 372 may be configured to modify the first timing scheme by adjusting the first number of cycles of the clock in which the one or more requests in the first scheduler 376 are to be issued to the first memory set 384 via the first memory set interface 380, based on the second priority level being met. The global scheduler 372 may, in some aspects, be configured to modify the second timing scheme by adjusting the second number of cycles of the clock in which the one or more requests in the second queue scheduler 378 are to be issued to the second memory set 386 via the second memory set interface 382, based on the second priority level criteria being met. In at least one aspect, the first priority level criteria may be different from the second priority level criteria. According to some aspects, the first priority level criteria may be equal to the second priority level criteria.

The RPQ hint operation may, in some aspects, be logically implemented as RPQHints(TypeMask, LatencyMask). In at least one aspect, the read hint operation may expose information about at least one of the first queue scheduler 376 or the second queue scheduler 378. According to at least one aspect, the exposed information may allow the software stack to specify the global timing scheme. As previously described, the global timing scheme may define the order and duration in which one or more requests are processed from the first queue scheduler 376 and/or the second queue scheduler 378.

In some aspects, the exposed information may include an ordered list for processing the one or more requests in the first queue scheduler 376 and/or the second queue scheduler 378. For instance, the exposed ordered list may indicate the following order: (i) first queue scheduler 376; (ii) second queue scheduler 378; (iii) first queue scheduler 376; (iv) second queue scheduler 378. According to at least one aspect, the exposed information may include process duration information the memory controller 306 indicating the length at which the memory controller 306 may process one or more requests in the first queue scheduler 376 and/or the second queue scheduler 378. For example, the exposed process duration information may indicate the following durations: (i) 10 cycles; (ii) 40 cycles; (iii) 10 cycles; (iv) 30 cycles.

In some aspects, the exposed information may include guard interval information indicating whether a guard interval is to be applied between two or more durations. For instance, the exposed guard interval information may indicate: (i) guard; (ii) no guard; (iii) guard. In at least one aspect, the exposed information may include information indicating whether overlapping is permitted between two or more durations. For example, the exposed overlap information may indicate: (i) no overlap; (ii) overlap; (iii) no overlap.

In some aspects, the global scheduler 372 may be configured to receive information from an interface to a processing core. According to at least one aspect, the global scheduler 372 may be configured to generate the global timing scheme based on the received information from the interface to the processing core. The interface to the processing core may, in some aspects, be an interface to an Industry Standard Architecture (ISA) interconnection. In at least one aspect, the interface to the processing core may be an interface to a model specific register (MSR).

Figure 6:
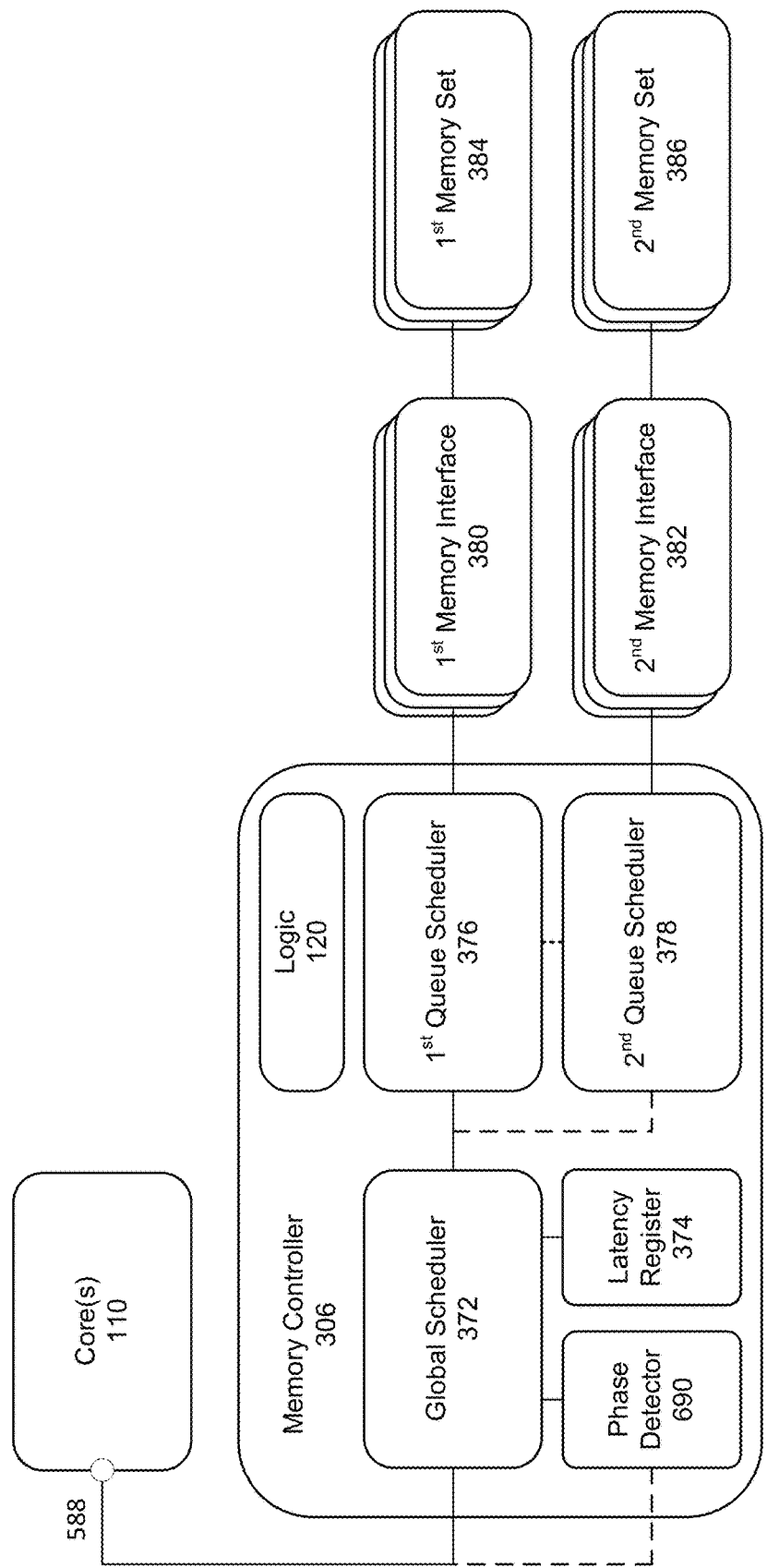
FIG. 6 shows a logical representation of a second memory controller system having a dynamic multi-channel mode configuration.

FIG. 6 shows a second logical representation of a memory controller system 600 having a dynamic multi-channel mode configuration. As shown in FIG. 6, system 600 may include one or more processing cores 110-1-110-M, a memory controller 306, a first memory set interface 380, a second memory set interface 382, a first memory set 384, a second memory set 386, and/or a one or more processor interfaces 588. Where previously described, one or more aforementioned aspects of such elements may be incorporated with respect to FIG. 6, either individually, collectively, or any combination thereof. Although the one or more processing cores 110-1-110-M, memory controller 306, the first memory set interface 380, the second memory set interface 382, the first memory set 384, the second memory set 386 and the one or more processor interfaces 588 are illustrated in the system 600 of FIG. 6, some aspects may employ additional or fewer processing cores, memory controllers, memory interfaces, memory sets and/or other elements. Furthermore, one or more components and/or aspects associated described with respect to system 600 of FIG. 6 may be incorporated into the system 100 of FIG. 1 and/or system 200 of FIG. 2.

As shown in FIG. 6, memory controller 306 may include logic 120, a global scheduler 372, a latency register 374, a first queue scheduler 376, a second queue scheduler 378 and/or phase detector 690. Where previously described, one or more aforementioned aspects of such elements may be incorporated with respect to FIG. 6, either individually, collectively, or any combination thereof. Although the logic 120, the global scheduler 372, the latency register 374, the first queue scheduler 376, and the second queue scheduler 378 are illustrated in the memory controller 306 of FIG. 6, some aspects may employ additional or fewer global schedulers, the latency registers, queue schedulers, and logic and/or other elements.

In some aspects, the logic 120 of the memory controller 106 may include a set of processor executable instructions, which when executed by one or more processors 102-1-102-N causes the one or more processors 102-1-102-N to implement the global scheduler 372 first queue scheduler 376, the second queue scheduler 378, and the phase detector 690. According to at least one aspect, phase detector 690 may be an ASIC. Phase detector 690 may, in some aspects, be a programmable device, such as a FPGA. As previously noted, the memory controller 306 may, in some aspects, be exposed to the information provided by the one or more processing cores 110-1-110-M.

In some aspects, the phase detector 690 may be configured to analyze the information exposed to the memory controller 306. According to at least one aspect, the phase detector 690 may be configured to receive, during a predefined duration, the information about the one or more requests to be included in at least one of the first queue scheduler 376 or the second queue scheduler 378 via the interface 588 to the processing core 110.

In some aspects, the phase detector 690 may be configured to determine whether the one or more requests to be included in the first queue scheduler 376, which were received within the predefined duration, meet a phase detection criteria for the first queue scheduler 376. According to at least one aspect, the phase detection criteria for the first queue scheduler 376 may be met when a sum of the one or more requests to be included in the first queue scheduler 376, which were received within the predefined duration, is greater than or equal to a phase detection threshold for the first queue scheduler 376. The phase detector 690 may, in some aspects, be configured to trigger the global scheduler 372 to modify at least one of the first timing scheme or the second timing scheme based on the phase detection criteria for the first queue scheduler 376 being met. In at least one aspect, the phase detector 690 may configured to modify at least one of the first timing scheme or the second timing scheme based on the phase detection criteria for the first queue scheduler 376 being met.

In some aspects, the phase detector 690 may be configured to determine whether the one or more requests to be included in the second queue scheduler 378, which were received within the predefined duration, meet a phase detection criteria for the second queue scheduler 378. According to at least one aspect, the phase detection criteria for the second queue scheduler 378 may be met when a sum of the one or more requests to be included in the second queue scheduler 378, which were received within the predefined duration, is greater than or equal to a phase detection threshold for the second queue scheduler 378. The phase detector 690 may, in some aspects, be configured to trigger the global scheduler 372 to modify at least one of the first timing scheme or the second timing scheme based on the phase detection criteria for the second queue scheduler 378 being met. In at least one aspect, the phase detector 690 may be configured to modify at least one of the first timing scheme or the second timing scheme based on the phase detection criteria for the second queue scheduler 378 being met.

FIG. 7 shows a first exemplary method 700 for performing a data operation of a memory controller in accordance with some aspects. In method 700 for performing a data operation of a memory controller, the method includes modifying at least one of a first timing scheme or a second timing scheme based on information about one or more data requests to be included in at least one of a first queue scheduler or a second queue scheduler, the first timing scheme indicating when one or more requests in the first queue scheduler are to be issued to the first memory set via a first memory set interface and over a common channel, the second timing scheme indicating when one or more requests in the second queue scheduler are to be issued to the second memory set via the second memory set interface and over the common channel 705, and issuing at least one of a request to the first memory set in accordance with the modified first timing scheme or a request to the second memory set in accordance with the modified second timing scheme 715.

Figure 8:
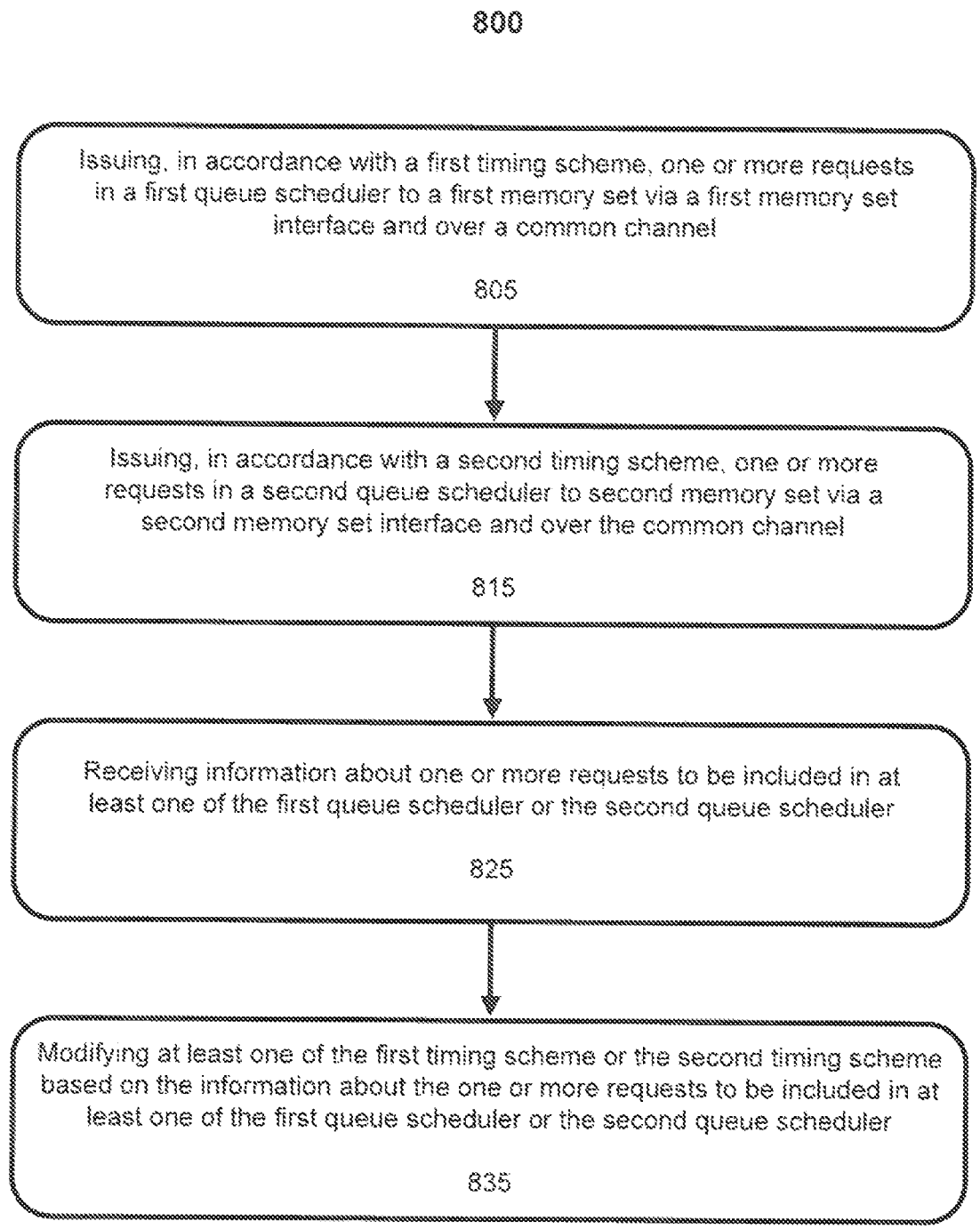
FIG. 8 shows a second exemplary method for performing a data operation in accordance with some aspects.

FIG. 8 shows a second exemplary method 800 for performing a data operation in accordance with some aspects. In method 800 for performing a data operation of a memory controller, the method includes issuing, in accordance with a first timing scheme, one or more requests in a first queue scheduler to a first memory set via a first memory set interface and over a common channel 805, issuing, in accordance with a second timing scheme, one or more requests in a second queue scheduler to second memory set via a second memory set interface and over the common channel 815, receiving information about one or more requests to be included in at least one of the first queue scheduler or the second queue scheduler 825, and modifying at least one of the first timing scheme or the second timing scheme based on the information about the one or more requests to be included in at least one of the first queue scheduler or the second queue scheduler 835.

FIG. 9 shows a third exemplary method 900 for performing a data operation in accordance with some aspects. In method 900 for performing a data operation of a memory controller, the method includes modifying at least one of a first timing scheme or a second timing scheme based on information about one or more data requests to be included in at least one of a first queue scheduler or a second queue scheduler, the first timing scheme indicating when one or more requests in the first queue scheduler are to be issued to the first memory set via a first memory set interface and over a common channel, the second timing scheme indicating when one or more requests in the second queue scheduler are to be issued to the second memory set via a second memory set interface and over the common channel 905, and issuing at least one of a request to the first memory set in accordance with the modified first timing scheme or a request to the second memory set in accordance with the modified second timing scheme 915.

Figure 10:
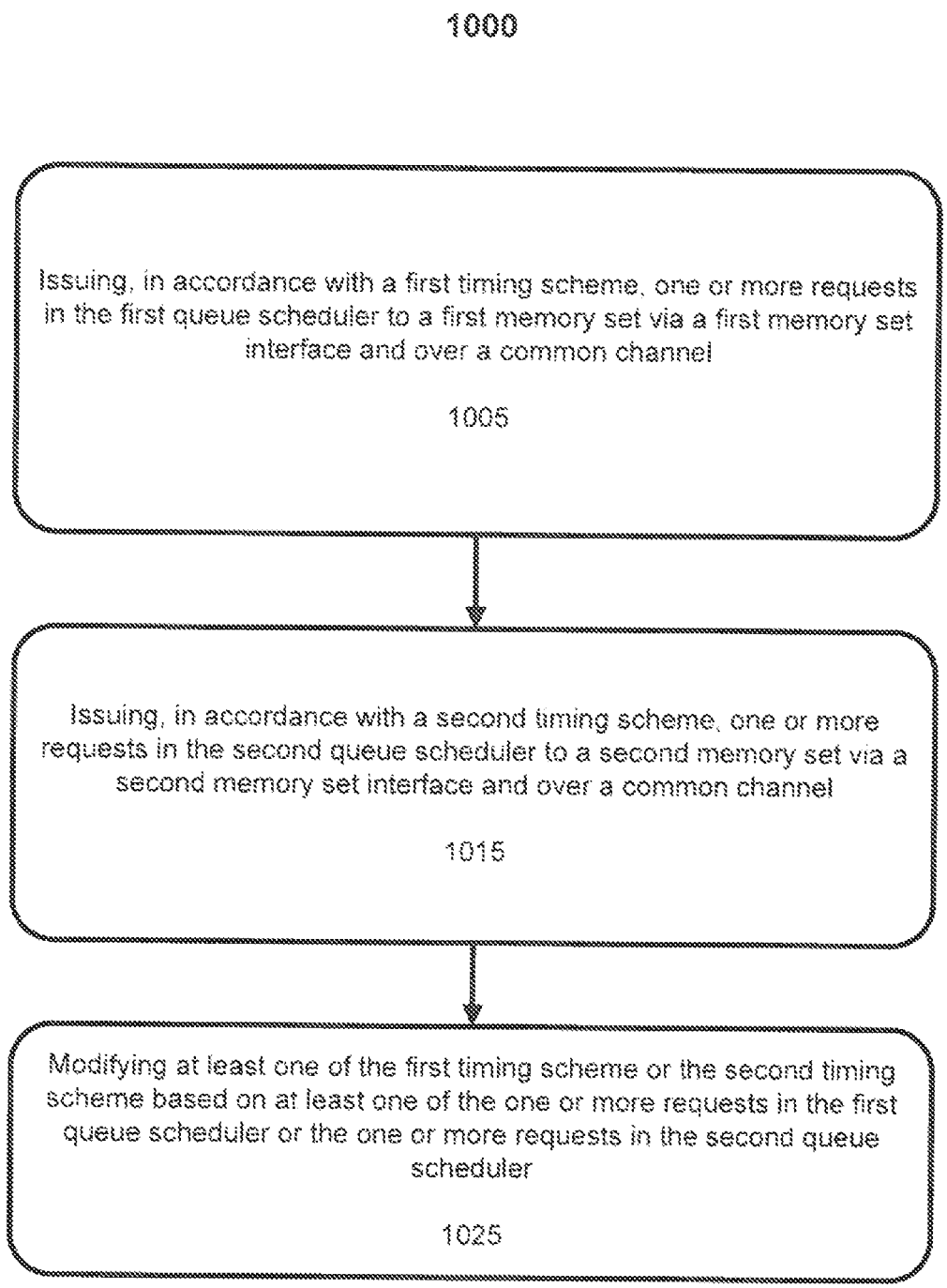
FIG. 10 shows a fourth exemplary method for performing a data operation in accordance with some aspects.

FIG. 10 shows a fourth exemplary method 1000 for performing a data operation in accordance with some aspects. In method 1000 for performing a data operation of a memory controller, the method includes issuing, in accordance with a first timing scheme, one or more requests in the first queue scheduler to a first memory set via a first memory set interface and over a common channel 1005, issuing, in accordance with a second timing scheme, one or more requests in the second queue scheduler to a second memory set via a second memory set interface and over the common channel 1015, and modifying at least one of the first timing scheme or the second timing scheme based on at least one of the one or more requests in the first queue scheduler or the one or more requests in the second queue scheduler 1025.

Although specific implementations of have been described with the elements of FIGS. 1-10, the present disclosure is not necessarily limited to these aspects. Additionally or alternatively, at least one or more circuits and/or processors described herein including the one or more processors 102-1-102-N, the memory controller 106, memory controller 206, memory controller 306, or the like may instead realize in any of preceding aspects, implementations and/or following examples.

The following examples pertain to further aspects of this disclosure:

Example 1 is a computing system that may include: a memory controller including a first queue scheduler configured to issue, in accordance with a first timing scheme, one or more requests in the first queue scheduler to a first memory set via a first memory set interface and over a common channel; a second queue scheduler configured to issue, in accordance with a second timing scheme, one or more requests in the second queue scheduler to second memory set via a second memory set interface and over the common channel; and a global scheduler configured to receive information about one or more requests to be included in at least one of the first queue scheduler or the second queue scheduler; and modify at least one of the first timing scheme or the second timing scheme based on the information about the one or more requests to be included in at least one of the first queue scheduler or the second queue scheduler.

Example 2 is a computing system that may include: a first memory set; a second memory set; and a memory controller configured to modify, by a global scheduler of the memory controller, at least one of a first timing scheme or a second timing scheme based on information about one or more data requests to be included in at least one of a first queue scheduler or a second queue scheduler, the first timing scheme indicating when one or more requests in the first queue scheduler are to be issued to the first memory set via a first memory set interface and over a common channel, the second timing scheme indicating when one or more requests in the second queue scheduler are to be issued to the second memory set via a second memory set interface and over the common channel, and issue at least one of a request to the first memory set in accordance with the modified first timing scheme or a request to the second memory set in accordance with the modified second timing scheme.

Example 3 is a computing system that may include: a memory controller including a first queue scheduler configured to issue, in accordance with a first timing scheme, one or more requests in the first queue scheduler to a first memory set via a first memory set interface and over a common channel; a second queue scheduler configured to issue, in accordance with a second timing scheme, one or more requests in the second queue scheduler to a second memory set via a second memory set interface and over the common channel; and a global scheduler configured to modify at least one of the first timing scheme or the second timing scheme based on at least one of the one or more requests in the first queue scheduler or the one or more requests in the second queue scheduler.

Example 4 is a computing system that may include: a first memory set; a second memory set; and a memory controller including a global scheduler configured to modify at least one of a first timing scheme or a second timing scheme based on information about one or more data requests included in at least one of a first queue scheduler or a second queue scheduler, the first timing scheme indicating when one or more requests in the first queue scheduler are to be issued to the first memory set via a first memory set interface and over a common channel, the second timing scheme indicating when one or more requests in the second queue scheduler are to be issued to the second memory set via a second memory set interface and over the common channel, and issue at least one of a request to the first memory set in accordance with the modified first timing scheme or a request to the second memory set in accordance with the modified second timing scheme.

In Example 5, the subject matter of Examples 1 or 2 can optionally include the global scheduler being further configured to modify at least one of the first timing scheme or the second timing scheme further based on at least one of the one or more requests in the first queue scheduler or the one or more requests in the second queue scheduler.

In Example 6, the subject matter of Examples 3 or 4 can optionally include the global scheduler being further configured to receive information about one or more requests to be included in at least one of the first queue scheduler or the second queue scheduler within a predefined duration.

In Example 7, the subject matter of Example 6 can optionally include the global scheduler being further configured to modify at least one of the first timing scheme or the second timing scheme further based on the information about the one or more requests to be included in at least one of the first queue scheduler or the second queue scheduler.

In Example 8, the subject matter of Examples 1, 3, 5, 6 or 7 can optionally include the memory controller being configured issue at least one of a request to the first memory set in accordance with the modified first timing scheme or a request to second memory set in accordance with the modified second timing scheme.

In Example 9, the subject matter of Examples 1 to 8 can optionally include the first queue scheduler being implemented as a first rotating priority queue (RPQ) scheduler.

In Example 10, the subject matter of Examples 1 to 9 can optionally include the global scheduler being further configured to provide the first timing scheme to the first queue scheduler.

In Example 11, the subject matter of Examples 1 to 10 can optionally include the one or more requests in the first queue scheduler include at least one of a write request targeting the first memory set or a read request targeting the first memory set.

In Example 12, the subject matter of Examples 1 to 11 can optionally include the one or more requests to be included in the first queue scheduler include at least one of a write request targeting the first memory set or a read request targeting the first memory set.

In Example 13, the subject matter of Examples 1 to 12 can optionally include the memory controller includes a clock, and the first timing scheme defines a first number of cycles of the clock in which the one or more requests in the first queue scheduler are to be issued to the first memory set via the first memory set interface.

In Example 14, the subject matter of Example 13 can optionally include the global scheduler being further configured to modify the first timing scheme by adjusting the first number of cycles of the clock in which the one or more requests in the first queue scheduler are to be issued to the first memory set via the first memory set interface.

In Example 15, the subject matter of Examples 1 to 14 can optionally include the first memory set including a dynamic random-access memory (DRAM), and the first memory set interface being implemented as a Double Data Rate (DDR) interface.

In Example 16, the subject matter of Examples 1 to 15 can optionally include the second queue scheduler being implemented as a second rotating priority queue (RPQ) scheduler.

In Example 17, the subject matter of Examples 1 to 16 can optionally include the global scheduler being further configured to provide the second timing scheme to the second queue scheduler.

In Example 18, the subject matter of Examples 1 to 17 can optionally include the one or more requests in the second queue scheduler include at least one of a write request targeting the second memory set or a read request targeting the second memory set.

In Example 19, the subject matter of Examples 1 to 18 can optionally include the one or more requests to be included in the second queue scheduler include at least one of a write request targeting the second memory set or a read request targeting the second memory set.

In Example 20, the subject matter of Examples 13 to 19 can optionally include the second timing scheme defines a second number of cycles of the clock in which the one or more requests in the second queue scheduler are to be issued to the second memory set via the second memory set interface.

In Example 21, the subject matter of Example 20 can optionally include the global scheduler being further configured to modify the second timing scheme by adjusting the second number of cycles of the clock in which the one or more requests in the second queue scheduler are to be issued to the second memory set via the second memory set interface.

In Example 22, the subject matter of Examples 20 or 21 can optionally include the first number of cycles of the clock being different from the second number of cycles of the clock.

In Example 23, the subject matter of Examples 20 or 21 can optionally include the first number of cycles of the clock being equal to the second number of cycles of the clock.

In Example 24, the subject matter of Examples 1 to 23 can optionally include the second memory set including a 3D XPoint memory, and the second memory set interface being implemented as a DDR-Transactional (DDR-T) interface.

In Example 25, the subject matter of Examples 1 to 24 can optionally include the global scheduler being further configured to receive a global timing scheme to via an interface to a processing core, and the global timing scheme includes the first timing scheme and the second timing scheme.

In Example 26, the subject matter of Example 25 can optionally include the first timing scheme includes the first number of cycles of the clock in which the one or more requests in the first queue scheduler are to be issued, during a first duration, to the first memory set via the first memory set interface, the second timing scheme includes the second number of cycles of the clock in which the one or more requests in the second queue scheduler are to be issued, during a second duration, to the second memory set via the second memory set interface, and the first duration and the second duration are sequential.

In Example 27, the subject matter of Examples 25 or 26 can optionally include the global scheduler being further configured to receive the information about the one or more requests to be included in at least one of the first queue scheduler or the second queue scheduler via the interface to the processing core.

In Example 28, the subject matter of Examples 1 to 27 can optionally include the global scheduler being further configured to determine whether the one or more requests in the first queue scheduler meet a capacity criteria for the first queue scheduler.

In Example 29, the subject matter of Example 28 can optionally include the capacity criteria for the first queue scheduler being met when a sum of the one or more requests in the first queue scheduler is greater than or equal to a capacity threshold for the first queue scheduler.

In Example 30, the subject matter of Example 29 can optionally include the capacity threshold for the first queue scheduler being a percentage of a total capacity of the first queue scheduler.

In Example 31, the subject matter of Examples 28 to 30 can optionally include the global scheduler being further configured to modify the first timing scheme based on the capacity criteria for the first queue scheduler being met.

In Example 32, the subject matter of Examples 28 to 31 can optionally include the global scheduler being further configured to modify the first timing scheme by adjusting the first number of cycles of the clock in which the one or more requests in the first queue scheduler are to be issued to the first memory set via the first memory set interface, based on the capacity criteria for the first queue scheduler being met.

In Example 33, the subject matter of Examples 1 to 32 can optionally include the global scheduler being further configured to determine whether the one or more requests in the second queue scheduler meet a capacity criteria for the second queue scheduler.

In Example 34, the subject matter of Example 33 can optionally include the capacity criteria for the second queue scheduler being met when a sum of the one or more requests in the second queue scheduler is greater than or equal to a capacity threshold for the second queue scheduler.

In Example 35, the subject matter of Example 34 can optionally include the capacity threshold for the second queue scheduler being a percentage of a total capacity of the second queue scheduler.

In Example 36, the subject matter of Examples 33 to 35 can optionally include the global scheduler being further configured to modify the second timing scheme based on the capacity criteria for the second queue scheduler being met.

In Example 37, the subject matter of Examples 33 to 36 can optionally include the global scheduler being further configured to modify the second timing scheme by adjusting the second number of cycles of the clock in which the one or more requests in the second queue scheduler are to be issued to the second memory set via the second memory set interface, based on the capacity criteria for the second queue scheduler being met.

In Example 38, the subject matter of Examples 34 to 37 can optionally include the capacity threshold for the first queue scheduler being less than or equal to the capacity threshold for the second queue scheduler.

In Example 39, the subject matter of Examples 34 to 37 can optionally include the capacity threshold for the first queue scheduler being greater than or equal to the capacity threshold for the second queue scheduler.

In Example 40, the subject matter of Examples 1, 2, 5, or 6 to 39 can optionally include the global scheduler being further configured to determine whether the one or more requests to be included in the first queue scheduler meet an auxiliary capacity criteria for the first queue scheduler.

In Example 41, the subject matter of Example 40 can optionally include the auxiliary capacity criteria for the first queue scheduler being met when a sum of the one or more requests to be included in the first queue scheduler is greater than or equal to an auxiliary capacity threshold for the first queue scheduler.

In Example 42, the subject matter of Example 41 can optionally include the auxiliary capacity threshold for the first queue scheduler being equal to the capacity threshold for the first queue scheduler minus the sum of the one or more requests to be included in the first queue scheduler.

In Example 43, the subject matter of Examples 40 to 42 can optionally include the global scheduler being further configured to modify the first timing scheme based on the auxiliary capacity criteria for the first queue scheduler being met.

In Example 44, the subject matter of Examples 40 to 43 can optionally include the global scheduler being further configured to modify the first timing scheme by adjusting the first number of cycles of the clock in which the one or more requests in the first queue scheduler are to be issued to the first memory set via the first memory set interface, based on the auxiliary capacity criteria for the first queue scheduler being met.

In Example 45, the subject matter of Examples 1, 2, 5, or 6 to 44 can optionally include the global scheduler being further configured to determine whether the one or more requests to be included in the second queue scheduler meet an auxiliary capacity criteria for the second queue scheduler.

In Example 46, the subject matter of Example 45 can optionally include the auxiliary capacity criteria for the second queue scheduler being met when a sum of the one or more requests to be included in the second queue scheduler is greater than or equal to an auxiliary capacity threshold for the second queue scheduler.

In Example 47, the subject matter of Example 46 can optionally include the auxiliary capacity threshold for the second queue scheduler being equal to the capacity threshold for the second queue scheduler minus the sum of the one or more requests to be included in the first queue scheduler.

In Example 48, the subject matter of Examples 45 to 47 can optionally include the global scheduler being further configured to modify the second timing scheme based on the auxiliary capacity criteria for the second queue scheduler being met.

In Example 49, the subject matter of Examples 45 to 48 can optionally include the global scheduler being further configured to modify the second timing scheme by adjusting the second number of cycles of the clock in which the one or more requests in the second queue scheduler are to be issued to the second memory set via the second memory set interface, based on the auxiliary capacity criteria for the second queue scheduler being met.

In Example 50, the subject matter of Examples 46 to 49 can optionally include the auxiliary capacity threshold for the first queue scheduler being less than or equal to the auxiliary capacity threshold for the second queue scheduler.

In Example 51, the subject matter of Examples 46 to 50 can optionally include the auxiliary capacity threshold for the first queue scheduler being greater than or equal to the auxiliary capacity threshold for the second queue scheduler.

In Example 52, the subject matter of Examples 1, 2, 5, or 6 to 51 can optionally include the global scheduler being further configured to determine whether a first request of the one or more requests to be included the first queue scheduler meets a first priority level criteria.

In Example 53, the subject matter of Example 52 can optionally include the first priority level criteria being met when the first request is to be processed by the memory controller within a threshold number of instructions to be processed by the memory controller.

In Example 54, the subject matter of Examples 52 or 53 can optionally include the first priority level criteria being met when a target address, to which the first request refers, will be accessed by the memory controller within the threshold number of instructions to be processed by the memory controller.

In Example 55, the subject matter of Examples 52 to 54 can optionally include the first priority level criteria being met when the target address, to which the first request refers, was previously accessed by the memory controller within a threshold number of instructions processed by the memory controller.

In Example 56, the subject matter of Examples 52 to 55 can optionally include the first priority level criteria being met when the target address, to which the first request refers, is associated with a latency sensitive application.

In Example 57, the subject matter of Examples 52 to 56 can optionally include the first priority level criteria being met when the target address, to which the first request refers, is associated with a latency resilient application.

In Example 58, the subject matter of Examples 52 to 57 can optionally include the global scheduler being further configured to modify at least one of the first timing scheme or the second timing scheme based on the first priority level criteria being met.

In Example 59, the subject matter of Examples 52 to 58 can optionally include the global scheduler being further configured to modify the first timing scheme by adjusting the first number of cycles of the clock in which the one or more requests in the first queue scheduler are to be issued to the first memory set via the first memory set interface, based on the first priority level criteria being met.

In Example 60, the subject matter of Examples 52 to 59 can optionally include the global scheduler being further configured to modify the second timing scheme by adjusting the second number of cycles of the clock in which the one or more requests in the second queue scheduler are to be issued to the second memory set via the second memory set interface, based on the first priority level criteria being met.

In Example 61, the subject matter of Examples 1, 2, 5, or 6 to 60 can optionally include the global scheduler being further configured to determine whether a second request of the one or more requests to be included the second queue scheduler meets a second priority level criteria.

In Example 62, the subject matter of Example 61 can optionally include the second priority level criteria being met when the second request is to be processed by the memory controller within the threshold number of instructions to be processed by the memory controller.

In Example 63, the subject matter of Examples 61 or 62 can optionally include the second priority level criteria being met when a target address, to which the second request refers, will be accessed by the memory controller within the threshold number of instructions to be processed by the memory controller.

In Example 64, the subject matter of Examples 61 to 63 can optionally include the second priority level criteria being met when the target address, to which the second request refers, was previously accessed by the memory controller within a threshold number of instructions processed by the memory controller.

In Example 65, the subject matter of Examples 61 to 64 can optionally include the second priority level criteria being met when the target address, to which the second request refers, is associated with a latency sensitive application.

In Example 66, the subject matter of Examples 61 to 65 can optionally include the second priority level criteria being met when the target address, to which the second request refers, is associated with a latency resilient application.

In Example 67, the subject matter of Examples 61 to 66 can optionally include the global scheduler being further configured to modify at least one of the first timing scheme or the second timing scheme based on the second priority level criteria being met.

In Example 68, the subject matter of Examples 61 to 67 can optionally include the global scheduler being further configured to modify the first timing scheme by adjusting the first number of cycles of the clock in which the one or more requests in the first queue scheduler are to be issued to the first memory set via the first memory set interface, based on the second priority level criteria being met.

In Example 69, the subject matter of Examples 61 to 68 can optionally include the global scheduler being further configured to modify or the second timing scheme by adjusting the second number of cycles of the clock in which the one or more requests in the second queue scheduler are to be issued to the second memory set via the second memory set interface, based on the second priority level criteria being met.

In Example 70, the subject matter of Examples 61 to 69 can optionally include the first priority level criteria being different from the second priority level criteria.

In Example 71, the subject matter of Examples 61 to 69 can optionally include the first priority level criteria being equal to the second priority level criteria.

In Example 72, the subject matter of Examples 1, 2, 5 or 6 to 71 may further include: a phase detector configured to receive, during a predefined duration, the information about the one or more requests to be included in at least one of the first queue scheduler or the second queue scheduler.

In Example 73, the subject matter of Example 72 can optionally include the phase detector being implemented as an application-specific integrated circuit (ASIC).

In Example 74, the subject matter of Example 72 can optionally include the phase detector being implemented as a field programmable gate array (FPGA).

In Example 75, the subject matter of Examples 72 to 74 can optionally include the phase detector being further configured to receive, during a predefined duration, the information about the one or more requests to be included in at least one of the first queue scheduler or the second queue scheduler via the interface to the processing core.

In Example 76, the subject matter of Examples 72 to 75 can optionally include the phase detector being further configured to determine whether the one or more requests to be included in the first queue scheduler, which were received within the predefined duration, meet a phase detection criteria for the first queue scheduler.

In Example 77, the subject matter of Example 76 can optionally include the phase detection criteria for the first queue scheduler being met when a sum of the one or more requests to be included in the first queue scheduler, which were received within the predefined duration, is greater than or equal to a phase detection threshold for the first queue scheduler.

In Example 78, the subject matter of Example 77 can optionally include the phase detector being further configured to trigger the global scheduler to modify at least one of the first timing scheme or the second timing scheme based on the phase detection criteria for the first queue scheduler being met.

In Example 79, the subject matter of Example 77 can optionally include the phase detector being further configured to modify at least one of the first timing scheme or the second timing scheme based on the phase detection criteria for the first queue scheduler being met.

In Example 80, the subject matter of Examples 72 to 79 can optionally include the phase detector being further configured to determine whether the one or more requests to be included in the second queue scheduler, which were received within the predefined duration, meet a phase detection criteria for the second queue scheduler.

In Example 81, the subject matter of Example 80 can optionally include the phase detection criteria for the second queue scheduler being met when a sum of the one or more requests to be included in the second queue scheduler, which were received within the predefined duration, is greater than or equal to a phase detection threshold for the second queue scheduler.

In Example 82, the subject matter of Example 81 can optionally inlcude the phase detector being further configured to trigger the global scheduler to modify at least one of the first timing scheme or the second timing scheme based on the phase detection criteria for the second queue scheduler being met.

In Example 83, the subject matter of Example 81 can optionally include the phase detector being further configured to modify at least one of the first timing scheme or the second timing scheme based on the phase detection criteria for the second queue scheduler being met.

Example 84 is a method for performing an operation of a memory controller, in which the method may include: issuing, in accordance with a first timing scheme, one or more requests in a first queue scheduler to a first memory set via a first memory set interface and over a common channel; issuing, in accordance with a second timing scheme, one or more requests in a second queue scheduler to second memory set via a second memory set interface and over the common channel; receiving information about one or more requests to be included in at least one of the first queue scheduler or the second queue scheduler; and modifying at least one of the first timing scheme or the second timing scheme based on the information about the one or more requests to be included in at least one of the first queue scheduler or the second queue scheduler.

Example 85 is a method for performing an operation of a memory controller, in which the method may include: modifying at least one of a first timing scheme or a second timing scheme based on information about one or more data requests to be included in at least one of a first queue scheduler or a second queue scheduler, the first timing scheme indicating when one or more requests in the first queue scheduler are to be issued to a first memory set via a first memory set interface and over a common channel, the second timing scheme indicating when one or more requests in the second queue scheduler are to be issued to a second memory set via a second memory set interface and over the common channel, and issuing at least one of a request to the first memory set in accordance with the modified first timing scheme or a request to the second memory set in accordance with the modified second timing scheme.

Example 86 is a method for performing an operation of a memory controller, in which the method may include: issuing, in accordance with a first timing scheme, one or more requests in the first queue scheduler to a first memory set via a first memory set interface and over a common channel; issuing, in accordance with a second timing scheme, one or more requests in the second queue scheduler to a second memory set via a second memory set interface and over the common channel; and modifying at least one of the first timing scheme or the second timing scheme based on at least one of the one or more requests in the first queue scheduler or the one or more requests in the second queue scheduler.

Example 87 is a method for performing an operation of a memory controller, in which the method may include: modifying at least one of a first timing scheme or a second timing scheme based on information about one or more data requests included in at least one of a first queue scheduler or a second queue scheduler, the first timing scheme indicating when one or more requests in the first queue scheduler are to be issued to a first memory set via a first memory set interface and over a common channel, the second timing scheme indicating when one or more requests in the second queue scheduler are to be issued to a second memory set via a second memory set interface and over the common channel, and issuing at least one of a request to the first memory set in accordance with the modified first timing scheme or a request to the second memory set in accordance with the modified second timing scheme.

In Example 88, the subject matter of Examples 84 or 85 may further include: modifying at least one of the first timing scheme or the second timing scheme further based on at least one of the one or more requests in the first queue scheduler or the one or more requests in the second queue scheduler.

In Example 89, the subject matter of Examples 86 or 87 may further include: receiving information about one or more requests to be included in at least one of the first queue scheduler or the second queue scheduler within a predefined duration.

In Example 90, the subject matter of Example 89 may further include: modifying at least one of the first timing scheme or the second timing scheme further based on the information about the one or more requests to be included in at least one of the first queue scheduler or the second queue scheduler.

In Example 91, the subject matter of Examples 84, 86, 88, 89 or 90 may further include: issuing at least one of a request to the first memory set in accordance with the modified first timing scheme or a request to second memory set in accordance with the modified second timing scheme.

In Example 92, the subject matter of Examples 84 to 91 can optionally include the first queue scheduler being implemented as a first rotating priority queue (RPQ) scheduler.

In Example 93, the subject matter of Examples 84 to 92 may further include: providing the first timing scheme to the first queue scheduler.

In Example 94, the subject matter of Examples 84 to 93 can optionally include the one or more requests in the first queue scheduler include at least one of a write request targeting the first memory set or a read request targeting the first memory set.

In Example 95, the subject matter of Examples 84 to 94 can optionally include the one or more requests to be included in the first queue scheduler include at least one of a write request targeting the first memory set or a read request targeting the first memory set.

In Example 96, the subject matter of Examples 84 to 95 can optionally include the first timing scheme defines a first number of cycles of a clock in which the one or more requests in the first queue scheduler are to be issued to the first memory set via the first memory set interface.

In Example 97, the subject matter of Example 96 can optionally include modifying at least one of the first timing scheme or the second timing scheme based on the information about the one or more requests to be included in at least one of the first queue scheduler or the second queue scheduler includes adjusting the first number of cycles of the clock in which the one or more requests in the first queue scheduler are to be issued to the first memory set via the first memory set interface.

In Example 98, the subject matter of Examples 96 or 97 can optionally include modifying at least one of the first timing scheme or the second timing scheme based on the information about the one or more requests included in at least one of the first queue scheduler or the second queue scheduler includes adjusting the first number of cycles of the clock in which the one or more requests in the first queue scheduler are to be issued to the first memory set via the first memory set interface.

In Example 99, the subject matter of Examples 84 to 98 can optionally include the first memory set including a dynamic random-access memory (DRAM), and the first memory set interface being implemented as a DDR interface.

In Example 100, the subject matter of Examples 84 to 99 can optionally include the second queue scheduler being implemented as a second rotating priority queue (RPQ) scheduler.

In Example 101, the subject matter of Examples 84 to 100 may further include: providing the second timing scheme to the second queue scheduler.

In Example 102, the subject matter of Examples 84 to 101 can optionally include the one or more requests in the second queue scheduler include at least one of a write request targeting the second memory set or a read request targeting the second memory set.

In Example 103, the subject matter of Examples 84 to 102 can optionally include the one or more requests to be included in the second queue scheduler include at least one of a write request targeting the second memory set or a read request targeting the second memory set.

In Example 104, the subject matter of Examples 96 to 103 can optionally include the second timing scheme defines a second number of cycles of the clock in which the one or more requests in the second queue scheduler are to be issued to the second memory set via the second memory set interface.

In Example 105, the subject matter of Example 104 can optionally include modifying at least one of the first timing scheme or the second timing scheme based on the information about the one or more requests to be included in at least one of the first queue scheduler or the second queue scheduler includes adjusting the second number of cycles of the clock in which the one or more requests in the second queue scheduler are to be issued to the second memory set via the second memory set interface.

In Example 106, the subject matter of Examples 104 or 105 can optionally include modifying at least one of the first timing scheme or the second timing scheme based on the information about the one or more requests included in at least one of the first queue scheduler or the second queue scheduler includes adjusting the second number of cycles of the clock in which the one or more requests in the second queue scheduler are to be issued to the second memory set via the second memory set interface.

In Example 107, the subject matter of Examples 104 to 106 can optionally include the first number of cycles of the clock being different from the second number of cycles of the clock.

In Example 108, the subject matter of Examples 104 to 106 can optionally include the first number of cycles of the clock being equal to the second number of cycles of the clock.

In Example 109, the subject matter of Examples 84 to 108 can optionally include the second memory set including a 3D XPoint memory and the second memory set interface being implemented as a DDR-T interface.

In Example 110, the subject matter of Examples 84 to 109 may further include: receiving a global timing scheme to via an interface to a processing core can optionally include the global timing scheme includes the first timing scheme and the second timing scheme.

In Example 111, the subject matter of Example 110 can optionally include the first timing scheme includes the first number of cycles of the clock in which the one or more requests in the second queue scheduler are to be issued, during a first duration, to the first memory set via the first memory set interface, the second timing scheme includes the second number of cycles of the clock in which the one or more requests in the second queue scheduler are to be issued, during a second duration, to the second memory set via the second memory set interface, and the first duration and the second duration are sequential.

In Example 112, the subject matter of Examples 110 or 111 can optionally include the information about the one or more requests to be included in at least one of the first queue scheduler or the second queue scheduler being received via the interface to the processing core.

In Example 113, the subject matter of Examples 84 to 112 may further include: determining whether the one or more requests in the first queue scheduler meet a capacity criteria for the first queue scheduler.

In Example 114, the subject matter of Example 113 can optionally include the capacity criteria for the first queue scheduler being met when a sum of the one or more requests in the first queue scheduler is greater than or equal to a capacity threshold for the first queue scheduler.

In Example 115, the subject matter of Example 114 can optionally include the capacity threshold for the first queue scheduler being a percentage of a total capacity of the first queue scheduler.

In Example 116, the subject matter of Examples 113 to 115 may further include: wherein modifying at least one of the first timing scheme or the second timing scheme based on at least one of the one or more requests in the first queue scheduler or the one or more requests in the second queue scheduler includes modifying the first timing scheme based on the capacity criteria for the first queue scheduler being met.

In Example 117, the subject matter of Example 116 can optionally include modifying the first timing scheme based on the capacity criteria for the first queue scheduler being met includes adjusting the first number of cycles of the clock in which the one or more requests in the first queue scheduler are to be issued to the first memory set via the first memory set interface, based on the capacity criteria for the first queue scheduler being met.

In Example 118, the subject matter of Examples 84 to 117 may further include: determining whether the one or more requests in the second queue scheduler meet a capacity criteria for the second queue scheduler.

In Example 119, the subject matter of Example 118 can optionally include the capacity criteria for the second queue scheduler being met when a sum of the one or more requests in the second queue scheduler is greater than or equal to a capacity threshold for the second queue scheduler.

In Example 120, the subject matter of Example 119 can optionally include the capacity threshold for the second queue scheduler being a percentage of a total capacity of the second queue scheduler.

In Example 121, the subject matter of Examples 118 to 120 can optionally include modifying at least one of the first timing scheme or the second timing scheme based on at least one of the one or more requests in the first queue scheduler or the one or more requests in the second queue scheduler includes modifying the second timing scheme based on the capacity criteria for the second queue scheduler being met.

In Example 122, the subject matter of Example 121 can optionally include modifying the second timing scheme based on the capacity criteria for the second queue scheduler being met includes adjusting the second number of cycles of the clock in which the one or more requests in the second queue scheduler are to be issued to the second memory set via the second memory set interface, based on the capacity criteria for the second queue scheduler being met.

In Example 123, the subject matter of Examples 119 to 122 can optionally include the capacity threshold for the first queue scheduler being less than or equal to the capacity threshold for the second queue scheduler.

In Example 124, the subject matter of Examples 119 to 122 can optionally include the capacity threshold for the first queue scheduler being greater than or equal to the capacity threshold for the second queue scheduler.

In Example 125, the subject matter of Examples 84, 85, 88, or 89 to 124 may further include: determining whether the one or more requests to be included in the first queue scheduler meet an auxiliary capacity criteria for the first queue scheduler.

In Example 126, the subject matter of Example 125 can optionally include the auxiliary capacity criteria for the first queue scheduler being met when a sum of the one or more requests to be included in the first queue scheduler is greater than or equal to an auxiliary capacity threshold for the first queue scheduler.

In Example 127, the subject matter of Example 126 can optionally include the auxiliary capacity threshold for the first queue scheduler being equal to the capacity threshold for the first queue scheduler minus the sum of the one or more requests to be included in the first queue scheduler.

In Example 128, the subject matter of Examples 125 to 127 can optionally include modifying at least one of the first timing scheme or the second timing scheme based on the information about the one or more requests to be included in at least one of the first queue scheduler or the second queue scheduler includes modifying the first timing scheme based on the auxiliary capacity criteria for the first queue scheduler being met.

In Example 129, the subject matter of Examples 125 to 128 can optionally include modifying the first timing scheme based on the auxiliary capacity criteria for the first queue scheduler being met includes adjusting the first number of cycles of the clock in which the one or more requests in the first queue scheduler are to be issued to the first memory set via the first memory set interface, based on the auxiliary capacity criteria for the first queue scheduler being met.

In Example 130, the subject matter of Examples 84, 85, 88, or 89 to 129 may further include: determining whether the one or more requests to be included in the second queue scheduler meet an auxiliary capacity criteria for the second queue scheduler.

In Example 131, the subject matter of Example 130 can optionally include the auxiliary capacity criteria for the second queue scheduler being met when a sum of the one or more requests to be included in the second queue scheduler is greater than or equal to an auxiliary capacity threshold for the second queue scheduler.

In Example 132, the subject matter of Example 131 can optionally include the auxiliary capacity threshold for the second queue scheduler being equal to the capacity threshold for the second queue scheduler minus the sum of the one or more requests to be included in the second queue scheduler.

In Example 133, the subject matter of Examples 130 to 132 can optionally include modifying at least one of the first timing scheme or the second timing scheme based on the information about the one or more requests to be included in at least one of the first queue scheduler or the second queue scheduler includes modifying the second timing scheme based on the auxiliary capacity criteria for the second queue scheduler being met.

In Example 134, the subject matter of Example 133 can optionally include modifying the second timing scheme based on the auxiliary capacity criteria for the second queue scheduler being met includes adjusting the second number of cycles of the clock in which the one or more requests in the second queue scheduler are to be issued to the second memory set via the second memory set interface, based on the auxiliary capacity criteria for the second queue scheduler being met.

In Example 135, the subject matter of Examples 131 to 134 can optionally include the auxiliary capacity threshold for the first queue scheduler being less than or equal to the auxiliary capacity threshold for the second queue scheduler.

In Example 136, the subject matter of Examples 131 to 134 can optionally include the auxiliary capacity threshold for the first queue scheduler being greater than or equal to the auxiliary capacity threshold for the second queue scheduler.

In Example 137, the subject matter of Examples 84, 85, 88, or 89 to 136 may further include: determining whether a first request of the one or more requests to be included the first queue scheduler meets a first priority level criteria.

In Example 138, the subject matter of Example 137 can optionally include the first priority level criteria being met when the first request is to be processed by the memory controller within a threshold number of instructions to be processed by the memory controller.

In Example 139, the subject matter of Examples 137 or 138 can optionally include the first priority level criteria being met when a target address, to which the first request refers, will be accessed by the memory controller within the threshold number of instructions to be processed by the memory controller.

In Example 140, the subject matter of Examples 137 to 139 can optionally include the first priority level criteria being met when the target address, to which the first request refers, was previously accessed by the memory controller within a threshold number of instructions processed by the memory controller.

In Example 141, the subject matter of Examples 137 to 140 can optionally include the first priority level criteria being met when the target address, to which the first request refers, is associated with a latency sensitive application.

In Example 142, the subject matter of Examples 137 to 141 can optionally include the first priority level criteria being met when the target address, to which the request of the one or more requests to be included in the first queue scheduler refers, is associated with a latency resilient application.

In Example 143, the subject matter of Examples 137 to 142 can optionally include modifying at least one of the first timing scheme or the second timing scheme based on the information about the one or more requests to be included in at least one of the first queue scheduler or the second queue scheduler includes modifying at least one of the first timing scheme or the second timing scheme based on the first priority level criteria being met.

In Example 144, the subject matter of Example 143 can optionally include modifying at least one of the first timing scheme or the second timing scheme based on the first priority level criteria being met includes modifying the first timing scheme by adjusting the first number of cycles of the clock in which the one or more requests in the first queue scheduler are to be issued to the first memory set via the first memory set interface, based on the first priority level criteria being met.

In Example 145, the subject matter of Examples 143 or 144 can optionally include modifying at least one of the first timing scheme or the second timing scheme based on the first priority level criteria being met includes modifying the second timing scheme by adjusting the second number of cycles of the clock in which the one or more requests in the second queue scheduler are to be issued to the second memory set via the second memory set interface, based on the first priority level criteria being met.

In Example 146, the subject matter of Examples 84, 85, 88, or 89 to 145 may further include: determining whether a second request of the one or more requests to be included the second queue scheduler meets a second priority level criteria.

In Example 147, the subject matter of Example 146 can optionally include the second priority level criteria being met when the second request is to be processed by the memory controller within the threshold number of instructions to be processed by the memory controller.

In Example 148, the subject matter of Examples 146 or 147 can optionally include the second priority level criteria being met when a target address, to which the second request refers, will be accessed by the memory controller within the threshold number of instructions to be processed by the memory controller.

In Example 149, the subject matter of Examples 146 to 148 can optionally include the second priority level criteria being met when the target address, to which the second request refers, was previously accessed by the memory controller within a threshold number of instructions processed by the memory controller.

In Example 150, the subject matter of Examples 146 to 149 can optionally include the second priority level criteria being met when the target address, to which the second request refers, is associated with a latency sensitive application.

In Example 151, the subject matter of Examples 146 to 150 can optionally include the second priority level criteria being met when the target address, to which the second request refers, is associated with a latency resilient application.

In Example 152, the subject matter of Examples 146 to 151 can optionally include modifying at least one of the first timing scheme or the second timing scheme based on the information about the one or more requests to be included in at least one of the first queue scheduler or the second queue scheduler includes modifying at least one of the first timing scheme or the second timing scheme based on the second priority level criteria being met.

In Example 153, the subject matter of Example 152 can optionally include modifying at least one of the first timing scheme or the second timing scheme based on the second priority level criteria being met includes modifying the first timing scheme by adjusting the first number of cycles of the clock in which the one or more requests in the first queue scheduler are to be issued to the first memory set via the first memory set interface, based on the second priority level criteria being met.

In Example 154, the subject matter of Examples 152 or 153 can optionally include modifying at least one of the first timing scheme or the second timing scheme based on the second priority level criteria being met includes modifying the second timing scheme by adjusting the second number of cycles of the clock in which the one or more requests in the second queue scheduler are to be issued to the second memory set via the second memory set interface, based on the second priority level criteria being met.

In Example 155, the subject matter of Examples 146 to 154 can optionally include the first priority level criteria being different from the second priority level criteria.

In Example 156, the subject matter of Examples 146 to 154 can optionally include the first priority level criteria being equal to the second priority level criteria.

In Example 157, the subject matter of Examples 84, 85, 88 or 89 to 156 can optionally include the information about the one or more requests to be included in at least one of the first queue scheduler or the second queue scheduler being received during a predefined duration.

In Example 158, the subject matter of Example 157 can optionally include the information about the one or more requests to be included in at least one of the first queue scheduler or the second queue scheduler being received during a predefined duration via the interface to the processing core.

In Example 159, the subject matter of Examples 157 or 158 may further include: determining whether the one or more requests to be included in the first queue scheduler, which were received within the predefined duration, meet a phase detection criteria for the first queue scheduler.

In Example 160, the subject matter of Example 159 can optionally include the phase detection criteria for the first queue scheduler being met when a sum of the one or more requests to be included in the first queue scheduler, which were received within the predefined duration, being greater than or equal to a phase detection threshold for the first queue scheduler.

In Example 161, the subject matter of Examples 159 or 160 can optionally include modifying at least one of the first timing scheme or the second timing scheme based on the information about the one or more requests to be included in at least one of the first queue scheduler or the second queue scheduler includes modifying of at least one of the first timing scheme or the second timing scheme based on the phase detection criteria for the first queue scheduler being met.

In Example 162, the subject matter of Example 161 can optionally include modifying of at least one of the first timing scheme or the second timing scheme based on the phase detection criteria for the first queue scheduler being met includes modifying the first timing scheme by adjusting the first number of cycles of the clock in which the one or more requests in the first queue scheduler are to be issued to the first memory set via the first memory set interface, based on the phase detection criteria for the first queue scheduler being met.

In Example 163, the subject matter of Examples 161 or 162 can optionally include modifying of at least one of the first timing scheme or the second timing scheme based on the phase detection criteria for the first queue scheduler being met includes modifying the second timing scheme by adjusting the second number of cycles of the clock in which the one or more requests in the second queue scheduler are to be issued to the second memory set via the second memory set interface, based on the phase detection criteria for the first queue scheduler being met.

In Example 164, the subject matter of Examples 157 to 163 may further include: determining whether the one or more requests to be included in the second queue scheduler, which were received within the predefined duration, meet a phase detection criteria for the second queue scheduler.

In Example 165, the subject matter of Example 164 can optionally include the phase detection criteria for the second queue scheduler being met when a sum of the one or more requests to be included in the second queue scheduler, which were received within the predefined duration, is greater than or equal to a phase detection threshold for the second queue scheduler.

In Example 166, the subject matter of Example 164 or 165 may further include: wherein modifying at least one of the first timing scheme or the second timing scheme based on the information about the one or more requests to be included in at least one of the first queue scheduler or the second queue scheduler includes modifying of at least one of the first timing scheme or the second timing scheme based on the phase detection criteria for the second queue scheduler being met.

In Example 167, the subject matter of Example 166 can optionally include modifying of at least one of the first timing scheme or the second timing scheme based on the phase detection criteria for the first queue scheduler being met includes modifying the first timing scheme by adjusting the first number of cycles of the clock in which the one or more requests in the first queue scheduler are to be issued to the first memory set via the first memory set interface, based on the phase detection criteria for the second queue scheduler being met.

In Example 168, the subject matter of Examples 166 or 167 can optionally include modifying of at least one of the first timing scheme or the second timing scheme based on the phase detection criteria for the first queue scheduler being met includes modifying the second timing scheme by adjusting the second number of cycles of the clock in which the one or more requests in the second queue scheduler are to be issued to the second memory set via the second memory set interface, based on the phase detection criteria for the second queue scheduler being met.

Example 169 is a computing device comprising one or more processors configured to perform the method of any one of Examples 84 to 168.

Example 170 is a processing circuit configured to perform the method of any one of Examples 84 to 168.

Example 171 is a non-transitory computer readable medium storing instructions that, when executed by a processor, cause the processor to perform the method of any one of Examples 84 to 168.

Example 172 is a non-transitory computer readable medium storing instructions that, when executed by processing circuitry of a computing device, cause the computing device to perform the method of any one of Examples 84 to 168.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The terminology used herein is for the purpose of describing particular example aspects only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example aspects.

While the disclosure has been particularly shown and described with reference to specific aspects, it should be understood by those skilled in the art that various changes in form and detail may be made therein without departing from the spirit and scope of the disclosure as defined by the appended claims. The various aspects of this disclosure are not necessarily mutually exclusive, as some aspects of this disclosure can be combined with one or more some aspects of this disclosure to form new aspects. The scope of the disclosure is thus indicated by the appended claims and all changes which come within the meaning and range of equivalency of the claims are therefore intended to be embraced.

What is claimed is:

1. A computing system, comprising:
a memory controller including a first queue scheduler allocated to a first memory set, and a second queue scheduler allocated to a second memory set,
the memory controller being configured to:
issue, in accordance with a first timing scheme generated for the first queue scheduler, one or more requests in the first queue scheduler to the first memory set via a first memory set interface and over a common channel,
issue, in accordance with a second timing scheme generated for the second queue scheduler, one or more requests in the second queue scheduler to the second memory set via a second memory set interface and over the common channel,
receive information about one or more requests to be included in at least one of the first queue scheduler or the second queue scheduler,
modify at least one of the first timing scheme or the second timing scheme based on the information about the one or more requests to be included in at least one of the first queue scheduler or the second queue scheduler, and
rotate between issuing the one or more requests in the first queue scheduler to the first memory set via the first memory set interface and over the common channel and issuing the one or more requests in the second queue scheduler via the second memory set interface and over the common channel, based on at least one of the modified first timing scheme or the modified second timing scheme.

2. The computing system of claim 1,
wherein the memory controller is configured to modify at least one of the first timing scheme or the second timing scheme further based on at least one of the one or more requests in the first queue scheduler or the one or more requests in the second queue scheduler.

3. The computing system of claim 1,
wherein the memory controller includes a clock,
wherein the first timing scheme includes a first duration having a first number of cycles of the clock in which at least one request of the one or more requests in the first queue scheduler is issued to the first memory set via the first memory set interface, and
wherein the second timing scheme includes a second duration having a second number of cycles of the clock in which at least one request of the one or more requests in the second queue scheduler is issued to the second memory set via the second memory set interface.

4. The computing system of claim 1,
wherein the first memory set comprises a dynamic random-access memory (DRAM), and
wherein the second memory set comprises a three-dimensional (3D) XPoint memory.

5. The computing system of claim 1,
wherein the first memory set interface is a Double Data Rate-4 Dual In-Line Memory Module (DDR-4 DIMM) socket configured to receive a DRAM DIMM including the first memory set, and
wherein the second memory set interface is a DDR-4 DIMM socket configured to receive a non-volatile DIMM (NVDIMM) including the second memory set.

6. The computing system of claim 1,
wherein the memory controller is further configured to:
determine whether the one or more requests in the first queue scheduler meet a capacity criteria for the first queue scheduler, and
modify the first timing scheme further based on the capacity criteria for the first queue scheduler being met.

7. The computing system of claim 1,
wherein the memory controller is further configured to:
determine whether the one or more requests to be included in the second queue scheduler meet an auxilliary capacity criteria for the second queue scheduler, and
modify the second timing scheme further based on the auxilliary capacity criteria for the second queue scheduler being met.

8. The computing system of claim 1,
wherein the memory controller is further configured to:
determine whether a first request of the one or more requests to be included the first queue scheduler meets a first priority level criteria, and
modify at least one of the first timing scheme or the second timing scheme further based on the first priority level criteria being met.

9. The computing system of claim 8,
wherein the first priority level criteria is met when the first request is to be processed by the memory controller within a threshold number of instructions.

10. The computing system of claim 8,
wherein the first priority level criteria is met when a target address, to which the first request refers, will be accessed by the memory controller within a threshold number of instructions.

11. A method for performing an operation of a memory controller, the method comprising:
rotating between issuing, in accordance with a first timing scheme generated for a first queue scheduler, one or more requests in the first queue scheduler to a first memory set via a first memory set interface and over a common channel, and issuing, in accordance with a second timing scheme generated for a second queue scheduler, one or more requests in the second queue scheduler to a second memory set via a second memory set interface and over the common channel; and
modifying at least one of the first timing scheme or the second timing scheme based on information about one or more requests to be included in at least one of the first queue scheduler or the second queue scheduler,
wherein the first timing scheme includes a first duration in which at least one request of the one or more requests in the first queue scheduler is issued to the first memory set via the first memory set interface and over the common channel, and
wherein the second timing scheme includes a second duration in which at least one request of the one or more requests in the second queue scheduler is issued to the second memory set via the second memory set interface and over the common channel.

12. The method of claim 11,
wherein modifying at least one of the first timing scheme or the second timing scheme includes:
modifying at least one of the first timing scheme or the second timing scheme further based on at least one of the one or more requests in the first queue scheduler or the one or more requests in the second queue scheduler.

13. The method of claim 11,
wherein the first duration includes a first number of cycles of a clock in which the at least one request of the one or more requests in the first queue scheduler is issued to the first memory set via the first memory set interface, and
wherein modifying at least one of the first timing scheme or the second timing scheme includes:
adjusting the first number of cycles of the clock in which the at least one request of the one or more requests in the first queue scheduler is issued to the first memory set via the first memory set interface.

14. The method of claim 11,
wherein the information about the one or more requests to be included in at least one of the first queue scheduler or the second queue scheduler is received during a predefined duration via an interface to a processing core.

15. The method of claim 14, further comprising:
determining whether the one or more requests to be included in the first queue scheduler, which were received within the predefined duration, meet a phase detection criteria for the first queue scheduler,
wherein the phase detection criteria for the first queue scheduler is met when a sum of the one or more requests to be included in the first queue scheduler, which were received within the predefined duration, is greater than or equal to a phase detection threshold for the first queue scheduler.

16. The method of claim 11,
wherein the first timing scheme further includes a third duration in which at least one request of the one or more requests in the first queue scheduler is issued to the first memory set via the first memory set interface and over the common channel, and
wherein the second timing scheme further includes a fourth duration in which at least one request of the one or more requests in the second queue scheduler is issued to the second memory set via the second memory set interface and over the common channel.

17. A computing system, comprising:
a memory controller including a first queue scheduler, and a second queue scheduler,
the memory controller being configured to:
issue, in accordance with a first timing scheme generated for the first queue scheduler, one or more requests in the first queue scheduler to a first memory set via a first memory set interface and over a common channel,
issue, in accordance with a second timing scheme generated for the second queue scheduler, one or more requests in the second queue scheduler to a second memory set via a second memory set interface and over the common channel,
modify at least one of the first timing scheme or the second timing scheme based on at least one of the one or more requests in the first queue scheduler or the one or more requests in the second queue scheduler, and
rotate between issuing the one or more requests in the first queue scheduler to the first memory set via the first memory set interface and over the common channel and issuing the one or more requests in the second queue scheduler via the second memory set interface and over the common channel, based on at least one of the modified first timing scheme or the modified second timing scheme,
wherein the common channel is a channel of a multi-channel memory architecture.

18. The computing system of claim 17,
wherein the memory controller is further configured to receive information about one or more requests to be included in at least one of the first queue scheduler or the second queue scheduler within a predefined duration.

19. The computing system of claim 18,
wherein the memory controller is configured to modify at least one of the first timing scheme or the second timing scheme further based on the information about the one or more requests to be included in at least one of the first queue scheduler or the second queue scheduler.

20. The method of claim 11,
wherein a guard interval is interposed between the first duration and the second duration.

* * * * *